US011937533B2

(12) United States Patent
Blackwell et al.

(10) Patent No.: US 11,937,533 B2
(45) Date of Patent: Mar. 26, 2024

(54) AIR ENTRAINMENT DEVICE, SYSTEMS, METHODS, AND APPARATUS

(71) Applicant: Kinze Manufacturing, Inc., Williamsburg, IA (US)

(72) Inventors: Robert Blackwell, Williamsburg, IA (US); Dan Killpack, Williamsburg, IA (US); Dalton McDowell, Williamsburg, IA (US); Matthew Wilhelmi, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 113 days.

(21) Appl. No.: 17/457,178

(22) Filed: Dec. 1, 2021

(65) Prior Publication Data

US 2022/0087095 A1 Mar. 24, 2022

Related U.S. Application Data

(62) Division of application No. 16/682,810, filed on Nov. 13, 2019.

(Continued)

(51) Int. Cl.
*A01C 7/08* (2006.01)
*A01C 15/00* (2006.01)
*B65G 53/12* (2006.01)

(52) U.S. Cl.
CPC ............ *A01C 7/082* (2013.01); *A01C 15/006* (2013.01); *B65G 53/12* (2013.01); *A01C 7/08* (2013.01)

(58) Field of Classification Search
None
See application file for complete search history.

(56) References Cited

U.S. PATENT DOCUMENTS

| 4,771,912 A | 9/1988 | van Wingerden |
| 4,852,809 A | 8/1989 | Davis et al. |

(Continued)

FOREIGN PATENT DOCUMENTS

| CN | 105453774 A | 4/2016 | |
| EP | 2591656 B1 * | 12/2016 | ............. A01C 7/081 |

(Continued)

OTHER PUBLICATIONS

Kinze Manufacturing, Inc., PCT/US2019/061225 filed Nov. 13, 2019, "The International Search Report and the Written Opinion of the International Searching Authority, or the Declaration", 15 pages, dated Mar. 9, 2020.

(Continued)

*Primary Examiner* — Joseph A Dillon, Jr.
(74) *Attorney, Agent, or Firm* — McKee, Voorhees & Sease, PLC

(57) ABSTRACT

A planter includes a seed a delivery system for delivering seed from one or more hoppers to one or more row units of the planter. The seed delivery system includes a number of seed entrainers. The seed entrainers receive seed from the one or more hoppers. The seed is combined with a fluid, such as air, which moves the seed through the seed entrainer and towards one or more row units of the planter. The entrainer includes one or more outlets, with the outlets corresponding to different row units, and the outlets can be varied based upon the need of seed delivery for the planter.

18 Claims, 25 Drawing Sheets

Related U.S. Application Data

(60) Provisional application No. 62/760,507, filed on Nov. 13, 2018.

(56) References Cited

U.S. PATENT DOCUMENTS

| | | | |
|---|---|---|---|
| 5,156,102 A * | 10/1992 | Andersen | A01C 7/081 111/178 |
| 5,379,706 A | 1/1995 | Gage et al. | |
| 6,047,652 A | 4/2000 | Prairie et al. | |
| 6,176,393 B1 | 1/2001 | Luxon | |
| 6,494,154 B2 | 12/2002 | Kinzenbaw et al. | |
| 6,845,724 B2 | 1/2005 | Mayerle et al. | |
| 7,021,224 B2 | 4/2006 | Mayerle et al. | |
| 7,025,010 B2 | 4/2006 | Martin et al. | |
| 7,182,029 B2 | 2/2007 | Johnson et al. | |
| 7,213,525 B2 | 5/2007 | Meyer et al. | |
| 7,938,072 B2 | 5/2011 | Wilhelmi et al. | |
| 8,234,987 B2 | 8/2012 | Georgison et al. | |
| 8,276,530 B2 | 10/2012 | Anderson et al. | |
| 8,448,585 B2 | 5/2013 | Wilhelmi et al. | |
| 8,800,458 B1 | 8/2014 | Wilhelmi et al. | |
| 9,215,840 B2 | 12/2015 | Johnson et al. | |
| 9,215,841 B2 | 12/2015 | Johnson et al. | |
| 9,237,687 B2 | 1/2016 | Sauder et al. | |
| 9,253,940 B2 | 2/2016 | Wilhelmi et al. | |
| 9,265,190 B2 | 2/2016 | Johnson et al. | |
| 9,750,177 B2 | 9/2017 | Johnson et al. | |
| 9,848,525 B2 | 12/2017 | Johnson et al. | |
| 9,854,731 B2 | 1/2018 | Henry et al. | |
| 9,924,627 B1 | 3/2018 | Beaujot et al. | |
| 9,980,425 B2 | 5/2018 | Wilhelmi et al. | |
| 10,051,779 B2 | 8/2018 | Chahley et al. | |
| 10,070,576 B2 | 9/2018 | Swanson | |
| 10,299,426 B2 | 5/2019 | Johnson et al. | |
| 10,709,056 B2 | 7/2020 | Johnson et al. | |
| 10,709,057 B2 | 7/2020 | Johnson et al. | |
| 10,757,855 B2 | 9/2020 | Johnson et al. | |
| 10,779,460 B2 | 9/2020 | Pirkenseer | |
| 10,842,072 B2 | 11/2020 | Wilhelmi et al. | |
| 11,277,960 B2 * | 3/2022 | Rieder | A01C 7/084 |
| 2004/0149186 A1 | 8/2004 | Stark et al. | |
| 2004/0159669 A1 | 8/2004 | Pollard et al. | |
| 2004/0206283 A1 | 10/2004 | Mayerle | |
| 2006/0042529 A1 * | 3/2006 | Johnson | A01C 7/081 111/175 |
| 2008/0295751 A1 | 12/2008 | Shoup et al. | |
| 2011/0162566 A1 | 7/2011 | Wilhelmi | |
| 2012/0111248 A1 | 5/2012 | Dillman | |
| 2012/0174840 A1 | 7/2012 | Friggstad | |
| 2013/0276684 A1 | 10/2013 | Wilhelmi et al. | |
| 2014/0193211 A1 | 7/2014 | Connors et al. | |
| 2016/0100518 A1 * | 4/2016 | Johnson | A01C 7/08 406/127 |
| 2016/0106027 A1 | 4/2016 | Wilhelmi et al. | |
| 2016/0165791 A1 | 6/2016 | Roszman et al. | |
| 2017/0142896 A1 | 5/2017 | Roberge et al. | |
| 2017/0318737 A1 | 11/2017 | Gilstring | |
| 2018/0235141 A1 * | 8/2018 | Johnson | A01C 7/084 |
| 2018/0271007 A1 | 9/2018 | Wilhelmi et al. | |
| 2019/0098828 A1 | 4/2019 | Wilhelmi et al. | |
| 2020/0053955 A1 | 2/2020 | Borkgren et al. | |
| 2020/0068789 A1 | 3/2020 | Rieder et al. | |
| 2020/0107496 A1 | 4/2020 | Gray et al. | |
| 2020/0170179 A1 | 6/2020 | Jagow et al. | |
| 2020/0359554 A1 * | 11/2020 | Lanyon | A01C 7/084 |
| 2021/0190567 A1 | 6/2021 | Nedved et al. | |
| 2022/0053687 A1 * | 2/2022 | Maro | A01C 15/007 |
| 2022/0078967 A1 * | 3/2022 | Crucianelli | A01C 7/082 |
| 2022/0167548 A1 * | 6/2022 | Rieder | A01C 7/082 |

FOREIGN PATENT DOCUMENTS

| | | |
|---|---|---|
| RU | 2228586 C2 | 7/2003 |
| WO | 2011003078 A1 | 1/2011 |

OTHER PUBLICATIONS

International Bureau in connection with PCT/US2019/061225 filed Nov. 13, 2019, "Notification Concerning Transmittal of International Preliminary Report on Patentability (Chapter 1 of the Patent Cooperation Treaty)", 8 pages, dated May 27, 2021.

* cited by examiner

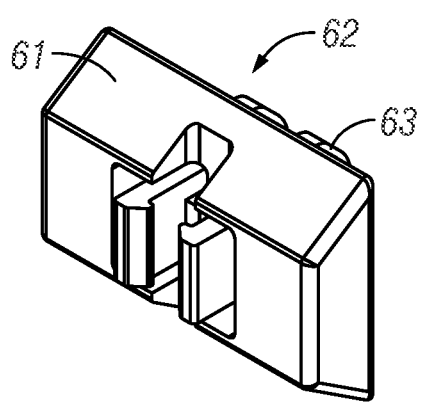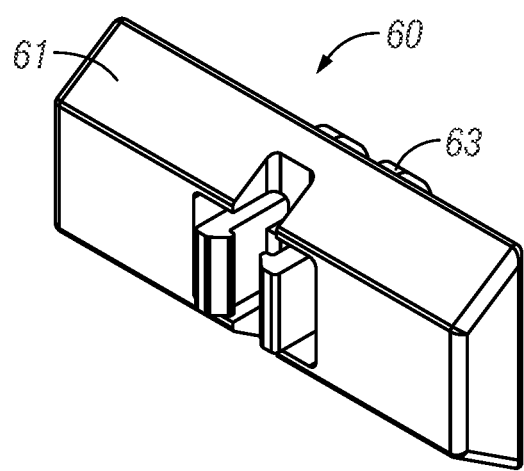
*FIG. 14A*  *FIG. 14B*

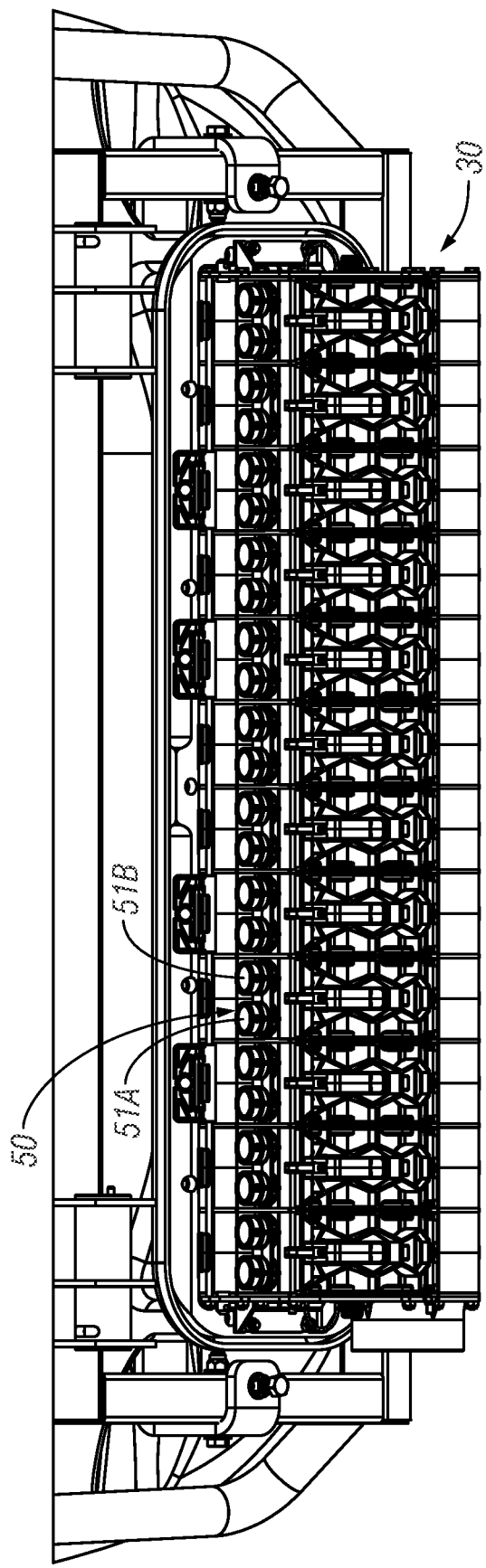

AIR ENTRAINMENT DEVICE, SYSTEMS, METHODS, AND APPARATUS

CROSS REFERENCE TO RELATED APPLICATIONS

This application is a Divisional Application of U.S. Ser. No. 16/682,810, filed Nov. 13, 2019, which claims priority under 35 U.S.C. § 119 to provisional patent application U.S. Ser. No. 62/760,507, filed Nov. 13, 2018, all of which are herein incorporated by reference in their entirety, including without limitation, the specification, claims, and abstract, as well as any figures, tables, appendices, or drawings thereof.

FIELD OF THE INVENTION

The invention relates generally to the field of agricultural equipment. More particularly, but not exclusively, the invention relates to systems, methods, and/or apparatus for moving particulate material, e.g., seed, from one location to another on, in, and/or around an agricultural implement.

BACKGROUND OF THE INVENTION

Large scale agricultural planters typically include a plurality of individual hoppers and seed metering units. During planting, the hopper holds the mass of seed that the planter distributes onto the ground. The metering units are responsible for delivering the seed to the ground. As the planter moves over the planting surface, it is important that the metering units distribute the seed uniformly and at precise intervals to achieve proper spacing of crops. To achieve such a distribution, it is important that the supply of seed to the seed meters is steady and uninterrupted.

U.S. Pat. Nos. 8,448,585 and 9,253,940, both to Wilhelmi et al., disclose an air entrainment device for seed delivery that utilizes an air permeable surface and are herein incorporated by reference in their entirety. While effective for its purpose of delivering seed, there still exists some room to make the air entrainment device more efficient.

SUMMARY OF THE INVENTION

Therefore, it is a principal object, feature, and/or advantage of the disclosed features to overcome the deficiencies in the art.

It is another object, feature, and/or advantage to increase the volume of particulate material being moved by the system, method, and/or apparatus as disclosed herein.

It is still another object, feature, and/or advantage to include one or more inserts for use with a device to adjust an amount of flow through the device.

It is yet another object, feature, and/or advantage to allow for the adjustability of the number of row units that can be associated with the system, method, and/or apparatus as disclosed herein.

It is a further object, feature, and/or advantage to provide a system, method, and/or apparatus to be used with a high speed planting implement.

It is still yet a further object, feature, and/or advantage to practice methods which facilitate use, manufacture, assembly, maintenance, and repair of an air entrainment system accomplishing some or all of the previously stated objectives.

The previous objects, features, and/or advantages, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to some aspects of the present disclosure, a seed delivery assembly includes a plurality of entrainers operatively connected to one another, with each of said entrainers comprising at least one seed entrance, at least one primary fluid path in communication with a fluid source, wherein a fluid and seed are combined at said at least one primary fluid path, at least one bypass path for receiving and directing an amount of the fluid, and at least one outlet. Each of the entrainers include a first configuration wherein the at least one outlet comprises first and second outlets and each of the first and second outlets are in fluid communication with separate row units of a planter, and a second configuration wherein the at least one outlet comprises a single outlet in fluid communication with a row unit of a planter.

According to some additional aspects of the present disclosure, each of the entrainers comprises a first and a second seed entrance, a first and a second primary fluid path that combines the fluid and seed, and a first and a second bypass path.

According to some aspects and/or embodiments of the disclosure, each entrainer further comprises a shared inner wall separating the first and second seed entrances.

According to some aspects and/or embodiments of the disclosure, the shared inner wall includes a removable portion to change between the first and second configurations.

According to some aspects and/or embodiments of the disclosure, the assembly further comprises a first and second outlet insert positioned at the first and second outlets when the entrainer is in the first configuration, said first and second outlet insert operatively connected to the separate row units by conduits.

According to some aspects and/or embodiments of the disclosure, the assembly further comprises a connector associated with each of the separate row units.

According to some aspects and/or embodiments of the disclosure, the assembly further comprises a single outlet insert positioned at both of the first and second outlets when the entrainer is in the second configuration, said single outlet insert operatively connected to the common row unit by a conduit.

According to some aspects and/or embodiments of the disclosure, the assembly further comprises a bypass insert positioned at least partially in the at least one bypass path.

According to some aspects and/or embodiments of the disclosure, the at least one bypass path comprises two paths and the bypass insert is positioned at a shared inner wall between the two paths.

According to some aspects and/or embodiments of the disclosure, the bypass insert includes a variable width to adjust the amount of fluid flow through the two bypass paths.

According to some other aspects of the present disclosure, a seed entrainer comprises at least one seed entrance, at least one primary fluid path in communication with a fluid source, wherein a fluid and seed are combined at said at least one primary fluid path, at least one bypass path for receiving and directing an amount of the fluid, and at least one outlet. The entrainer has a first configuration wherein the at least one outlet comprises first and second outlets and each of the first and second outlets are in fluid communication with separate row units of a planter, and a second configuration wherein the at least one outlet comprises a single outlet in fluid communication with a row unit of a planter.

According to some aspects and/or embodiments of the disclosure, the entrainer further comprises a bypass insert positioned in the at least one bypass path to adjust an amount of fluid passing through the at least one bypass path.

According to some aspects and/or embodiments of the disclosure, the at least one outlet comprises an outlet insert positioned at or near a location where the at least one primary path and the at least one bypass path combine.

According to some aspects and/or embodiments of the disclosure, the outlet insert comprises first and second exits in the first configuration, or a single exit in the second configuration.

According to some aspects and/or embodiments of the disclosure, wherein in the second configuration, the outlet has an exit that is larger than outlet exits of the first configuration.

According to some other aspects of the present disclosure, a method of for delivering seed from one or more hoppers to a row unit of a planter including a plurality of row units comprises delivering seed from the one or more hoppers to a seed entrainer, introducing airflow to the seed entrainer such that a first air stream of the airflow is combined with seed, and a second air stream bypasses the seed, and recombining the first and second air streams of the airflow and seed at or near an outlet. The outlet comprises a first configuration comprising first and second outlets and wherein each of the first and second outlets are in fluid communication with separate row units of a planter, and a second configuration wherein the outlet comprises a single outlet in fluid communication with a row unit of a planter.

According to some aspects and/or embodiments of the disclosure, the method further comprises splitting the introduced airflow into a first and third air streams in the seed entrainer, wherein the first and third air streams combine with seed in different channels of the seed entrainer.

According to some aspects and/or embodiments of the disclosure, the method further comprises splitting the introduced airflow into a second and fourth air streams in the seed entrainer, wherein the second and fourth air streams bypasses seed in different channels of the air entrainer.

According to some aspects and/or embodiments of the disclosure, the method further comprises recombining the first and second air streams at a first exit of the seed entrainer, and the third and fourth air streams at a second exit of the seed entrainer.

According to some aspects and/or embodiments of the disclosure, the method further comprises wherein, in the first configuration of the outlet, the first and second exits are separated to deliver seed to different row units, and wherein, in the second configuration, the first and second exits are combined at the single outlet to deliver seed to a single row unit.

These and/or other objects, features, advantages, aspects, and/or embodiments will become apparent to those skilled in the art after reviewing the following brief and detailed descriptions of the drawings.

BRIEF DESCRIPTION OF THE DRAWINGS

FIGS. 14A and 14B are inserts for use with one or more air entrainment devices.
FIG. 22 is a rear view of an air entrainment system.

Figure 1:
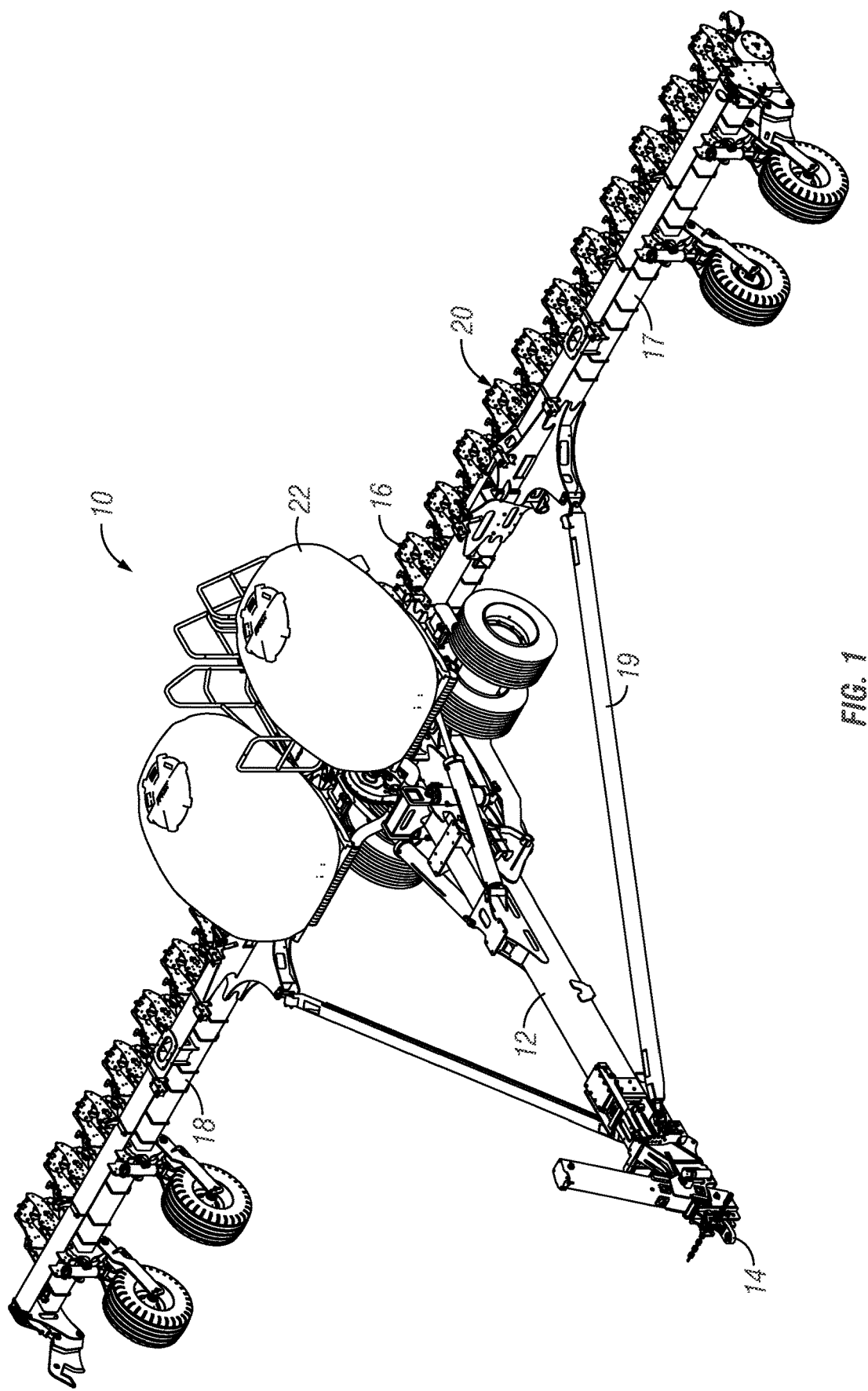
FIG. 1 is a perspective view of a planting implement including the air entrainment assembly.

Several embodiments which may be practiced are illustrated and described in detail, wherein like reference characters represent like components throughout the several views. The drawings are presented for exemplary purposes and may not be to scale, unless otherwise indicated, and thus proportions of features in the drawings shall not be construed as evidence of actual proportions.

DETAILED DESCRIPTION OF THE INVENTION

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms “a,” “an,” and “the” include both singular and plural referents.

The term “or” is synonymous with “and/or” and means any one member or combination of members of a particular list.

The terms “invention” or “present invention” as used herein are not intended to refer to any single embodiment of the particular invention but encompass all possible embodiments as described in the specification and the claims.

The term “about” as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, lateral, medial, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

Reference is made to the accompanying drawings which form a part hereof, and in which is shown by way of illustration specific embodiments in which the invention may be practiced. These embodiments of the invention will be described in detail with reference to the drawings, wherein like reference numerals represent like parts throughout the several views. These embodiments are described in sufficient detail to enable those skilled in the art to practice the invention, and it is to be understood that other embodiments may be utilized, and that mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

Figure 2:
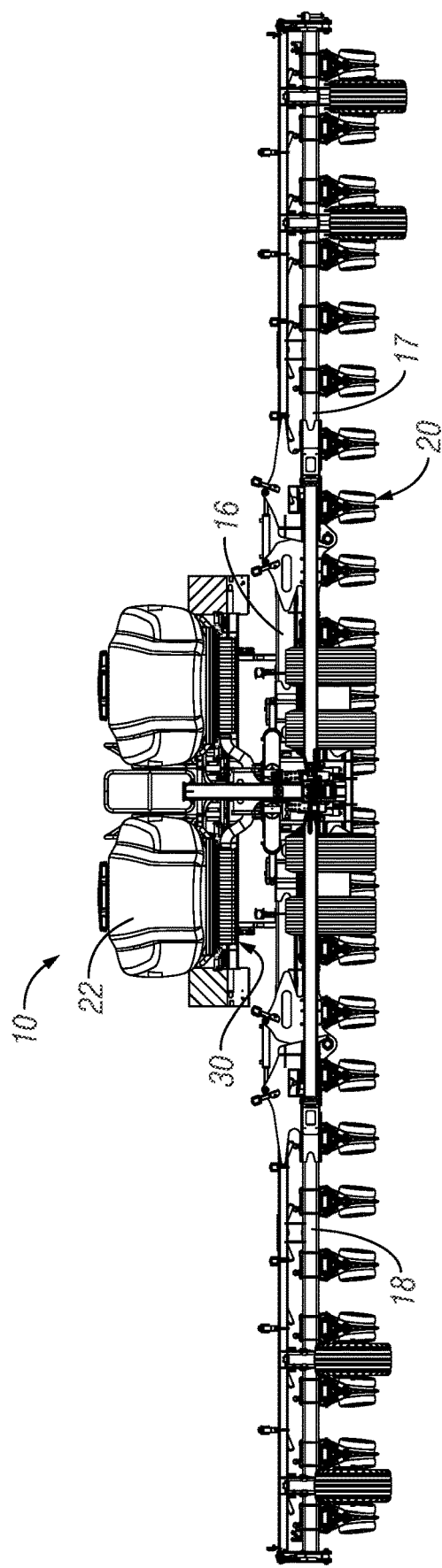
FIG. 2 is a front elevation view of the planting implement.
Figure 3:
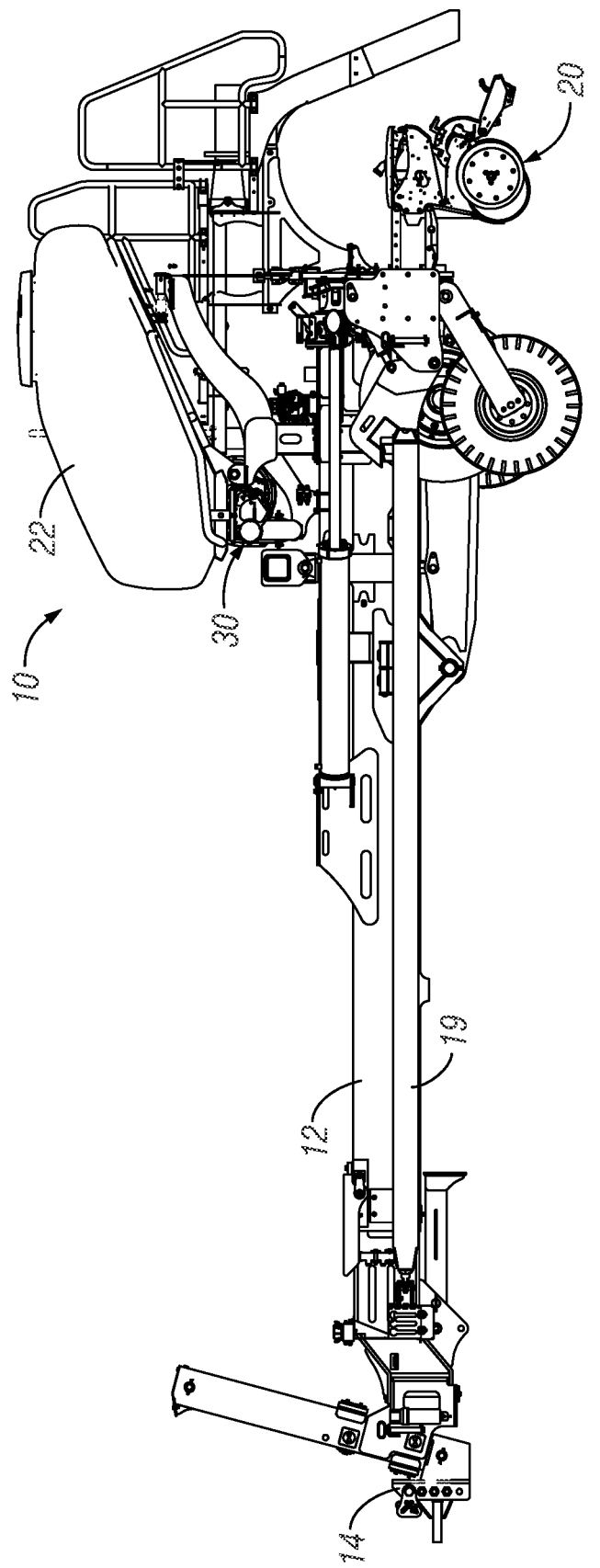
FIG. 3 is a side elevation view of the planting implement.

As used herein, the terminology such as vertical, horizontal, top, bottom, upper, lower, front, rear, end, sides, and the like, are referenced according to the views presented. It should be understood, however, that the terms are used only for purposes of description and are not intended to be used as limitations. Accordingly, orientation of an object or a combination of objects may change without departing from the scope of the invention. FIGS. 1-3 disclose use of an exemplary agricultural implement 10. The agricultural implement 10 as shown in the figures is a planting implement 10. The implement 10 may be generally any implement for engaging with the ground or otherwise distributing a material, such as a particulate material to the ground. As will be understood, the invention relates to ways to distribute material, such as a particulate material to various ground engaging apparatus to evenly distribute said particulate material into accurately, efficiently, and in some embodiments at high speed distribute said particulate material to or in said ground. Furthermore, as will be understood, while the planting implement 10 as shown in the figures is provided, additional types of implements including additional planting implements with various features as is known can utilize the invention and/or aspects thereof to be able to distribute and apply the particulate material, such as seed, to the ground.

Figure 4:
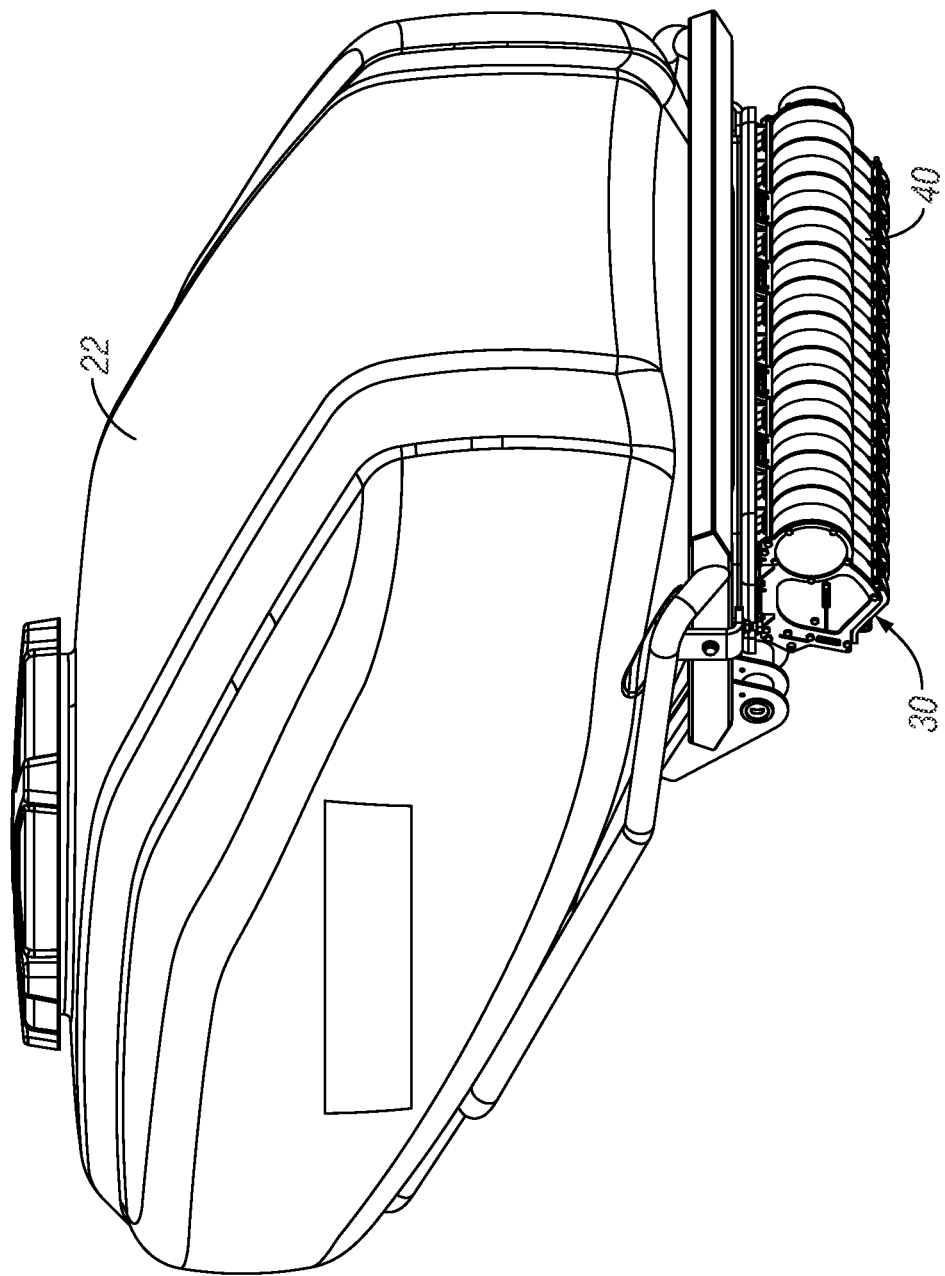
FIG. 4 is a perspective view of an air seed delivery system including an exemplary hopper and an air entrainment assembly.
Figure 5:
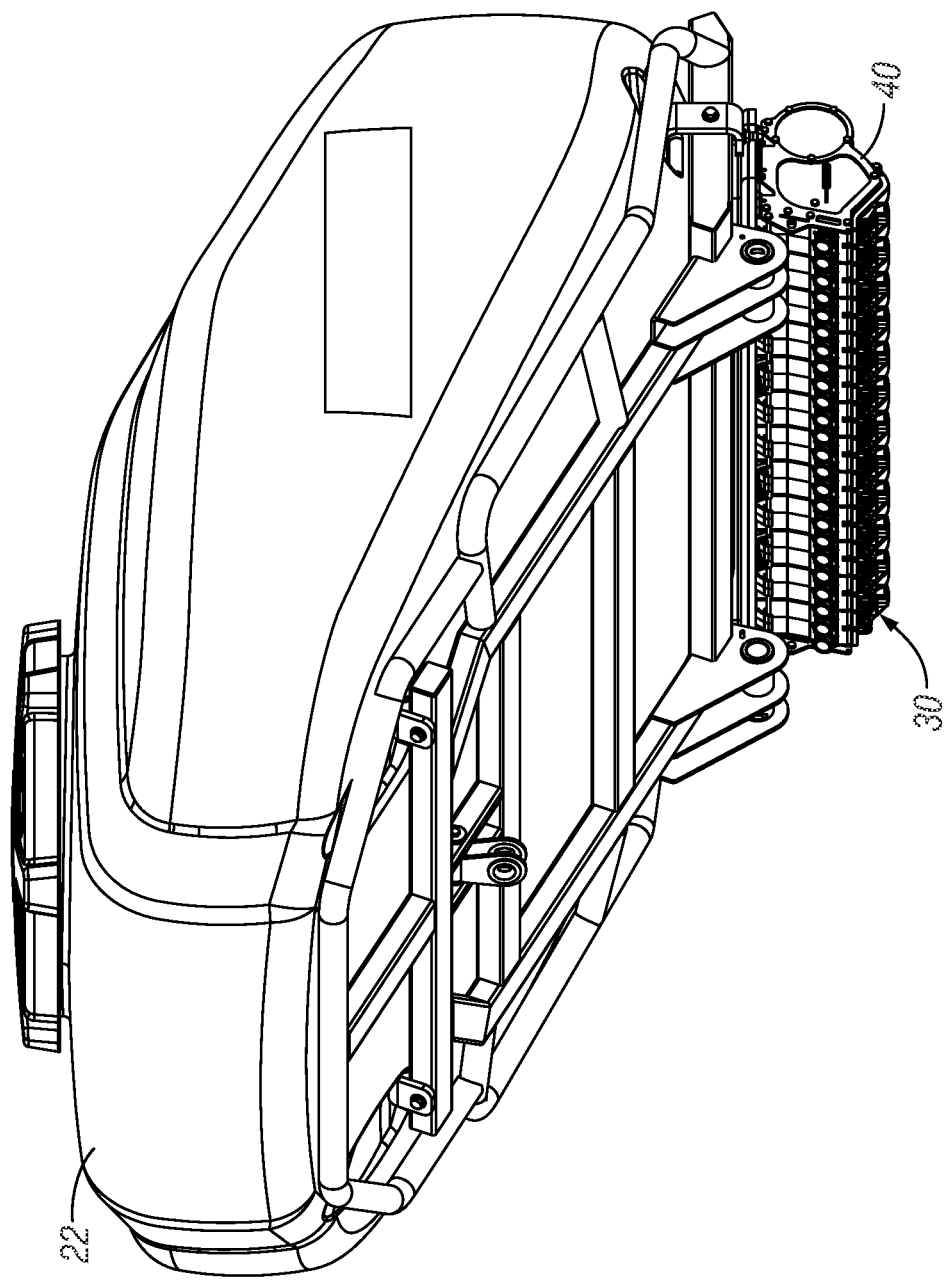
FIG. 5 is another perspective view of the system of FIG. 4.
Figure 6:
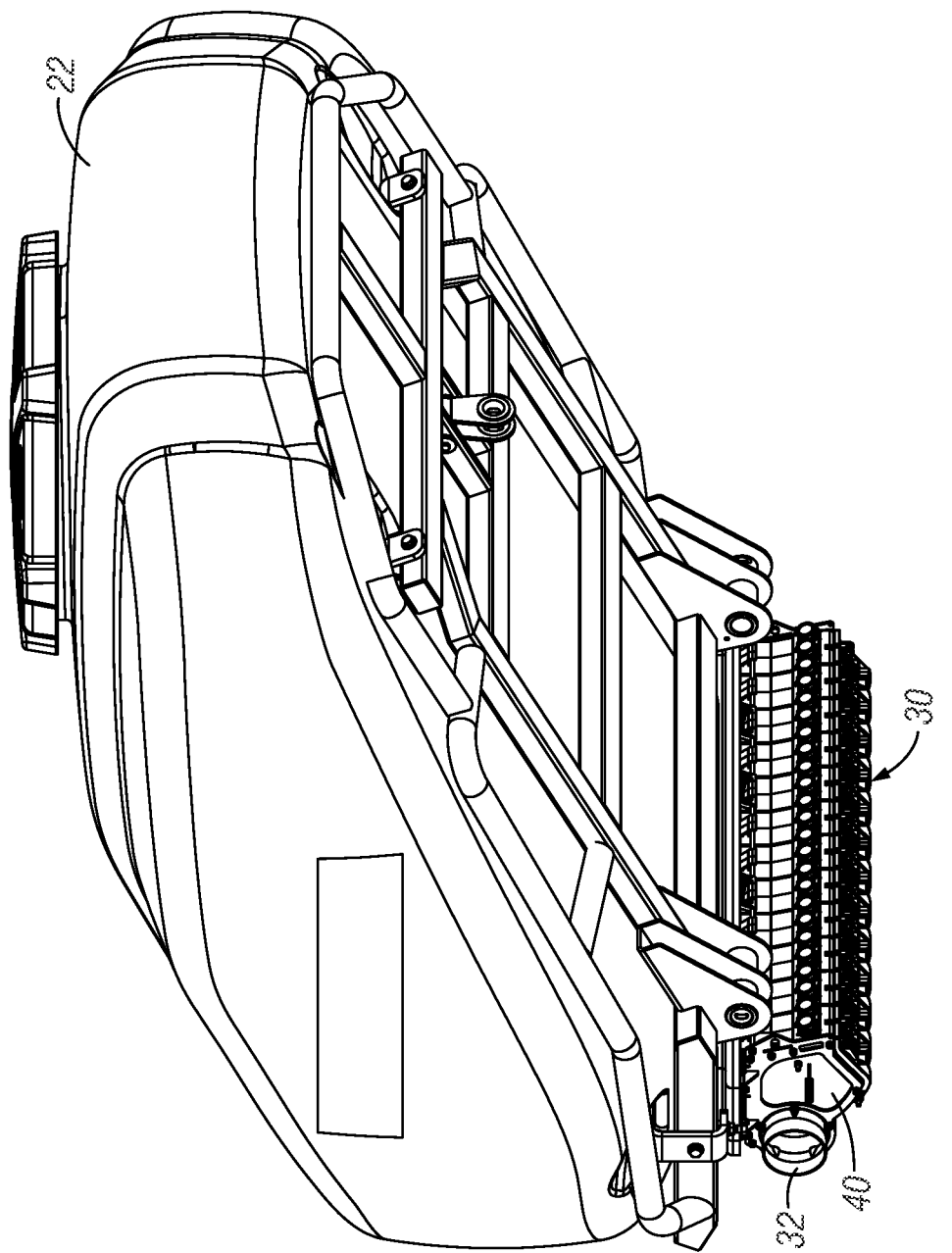
FIG. 6 is another perspective view of the system of FIG. 4.

Therefore, the planting implement 10 as shown in the figures includes a tongue 12 with a hitch 14 at a first end and a tool bar extending generally transversely to the tongue 12 at a second end. The tool bar 16 extends to connect to a plurality of row units 20 which include ground engagement apparatus. As will be disclosed, the row units 20 may also include additional aspects such as metering elements, singulation elements, ground opening and closing elements, and the like. The particular configuration of the row unit is not to be dispositive or limiting on the invention. However, according to some embodiments the row unit 20 will include a row unit and metering system such as disclosed in U.S. patent application Ser. No. 16/146,536, which is hereby incorporated by reference in its entirety. However, it is to be appreciated that generally other types of row units, ground engaging elements, and/or metering elements can utilize any of the aspects of the invention disclosed herein. Extending outwardly from the toolbar 16 and also generally transverse to the tongue 12 are wing elements 17 and 18. The wing elements 17, 18 provide additional width of the toolbar such that additional row units 20 can be attached along thereto. This will allow for a greater number of row units 20 to be attached to the toolbar to be used for distributing for a particulate material. Additional elements show in the figures include draft links 19, which generally connect the wings 17, 18 to the tongue 12. One or more actuators can be connected to the system to provide for the wings 17, 18 to be folded in a generally forward manner wherein they will be somewhat parallel to the tongue 12 to move the planting implement 10 from a field use configuration to a row use configuration. However, additional planting units may include that the toolbar is lift and rotated, is folded rearwardly, does not fold at all, or include some sort of combination thereof. Still further, the figures show the inclusion of hopper 22 in the form of bulk hoppers. The figures show two hoppers 22 positioned generally on the implement 10. As will be understood the hoppers will hold a rather large amount of particulate material that can be distributed to the row units 20 along the length of the toolbar 16 to apply and/or distribute the particulate material via the row units 20. FIGS. 4-6 show additional elements of an exemplary bulk hopper 22 including aspects of the invention. The shape and size of the hopper 22 is not dispositive on the invention itself, except for the fact that the hopper 22 will be able to hold an amount of material to be distributed to multiple row units for use therein, with the goal being that the hoppers will not be refilled as often as smaller hoppers potentially positioned at each of the individual row units. To aid in distributing the material from a hopper 22 to a plurality of row units 20, aspects of the invention include a seed delivery assembly 30. The seed assembly 30 is a fluid driven assembly that includes a plurality of entrainers 40 connect to one another. A fluid source 33 is connected to the assembly 30, such as at the inlet 32 shown in FIG. 6. The particulate material of the hopper 22 will be fed into the plurality of entrainers 40 of the seed deliver 30, and the fluid provided by the fluid source 33 will aid in moving the particulate material from the individual entrainers 40 towards the row units 20, where they can be distributed to the ground.

While the invention generally includes the use of a fluid source 33, it is to be appreciated that in some embodiments the fluid source would be a fan or other air source to provide air to move the seeds to the row units. However, it should be appreciated that other types of fluid sources, such as those providing a pressurized amount of a fluid can be used to combine with the particulate material of the hopper 22 to be distributed towards the row units 20 of the planting implement 10. Furthermore, as will be understood, the assembly 30 is positioned generally below the hoppers 22 to aid in the use of gravity of the particulate material to move from the hopper 22 into the entrainers 40 of the assembly 30.

Figure 7:
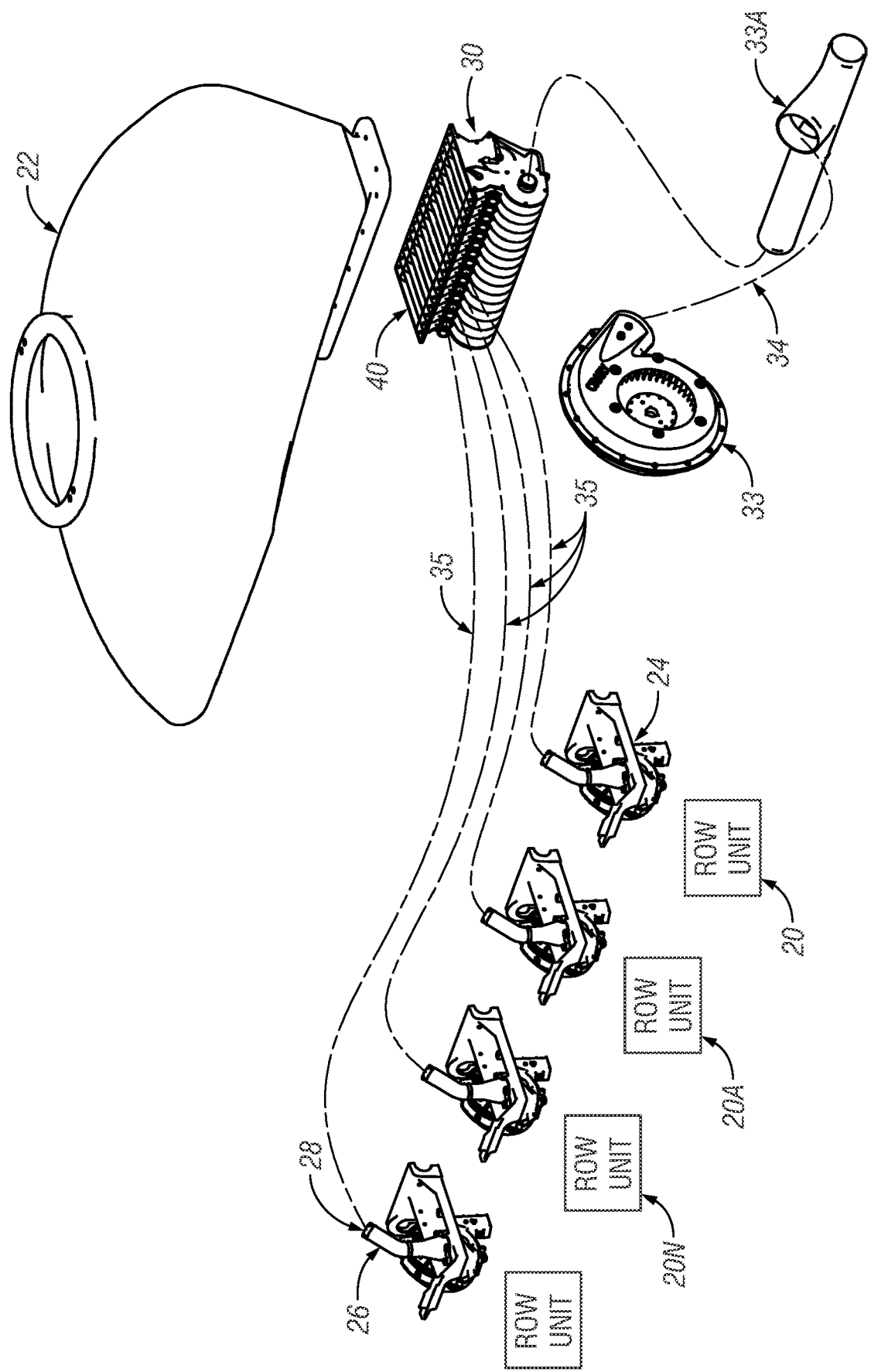
FIG. 7 is a perspective diagram, partly in schematic form, of the air seed delivery system incorporating an air entrainment assembly.

FIG. 7 is an exemplary schematic showing a system utilizing concepts of the invention. As shown, a bulk hopper 22 is provided and a seed delivery assembly 30 is positioned generally below the hopper 22. The assembly 30 includes a plurality of air entrainers 40 connected to another below the hopper 22 to receive the particulate material from the hopper 22 into the entrainers 40. A fan 43 is connected via a conduit 34 to a manifold 33a and further to the assembly 30 via the inlet 32 of at least one of the entrainers 40 of the assembly 30. Outlets 48 of the entrainers 40 are connected to row units 20, 20a, 20n, etc., via conduits 35. The conduits 35 may take the form of tubing, hoses or other conduits which can contain and transfer an amount of particulate material and/or fluid between the assembly 30 and the row units. Furthermore, the row units can be numbered generally as need in amounts, and therefore, the designation of 20n is to designate as many row units as are found on a planter or planting implement 10. Furthermore, as is shown in the figure, at least one metering member 24 such as a seed meter, is positioned at each row unit 20 and includes a seed inlet 26 and a seed port 28. The seed port 26 can be connected to the seed delivery assembly 30 via the conduit 35 with the seed port 28 allowing the connection and passage of the seed or other particular matter to be distributed from the assembly 30 to each of the metering members 24 of each of the row units 20. Therefore, the seed delivery assembly 30 will be disclosed in which a novel and unique system will be applied to various components thereof, in order to efficiently and accurately provide an on demand amount of seed or other particulate material from one or more hoppers of an implement to one or more row units, and in particular, to one or more metering elements of each of the one or more row units to be distributed, applied, or otherwise delivered via the row units to the ground.

Figure 8:
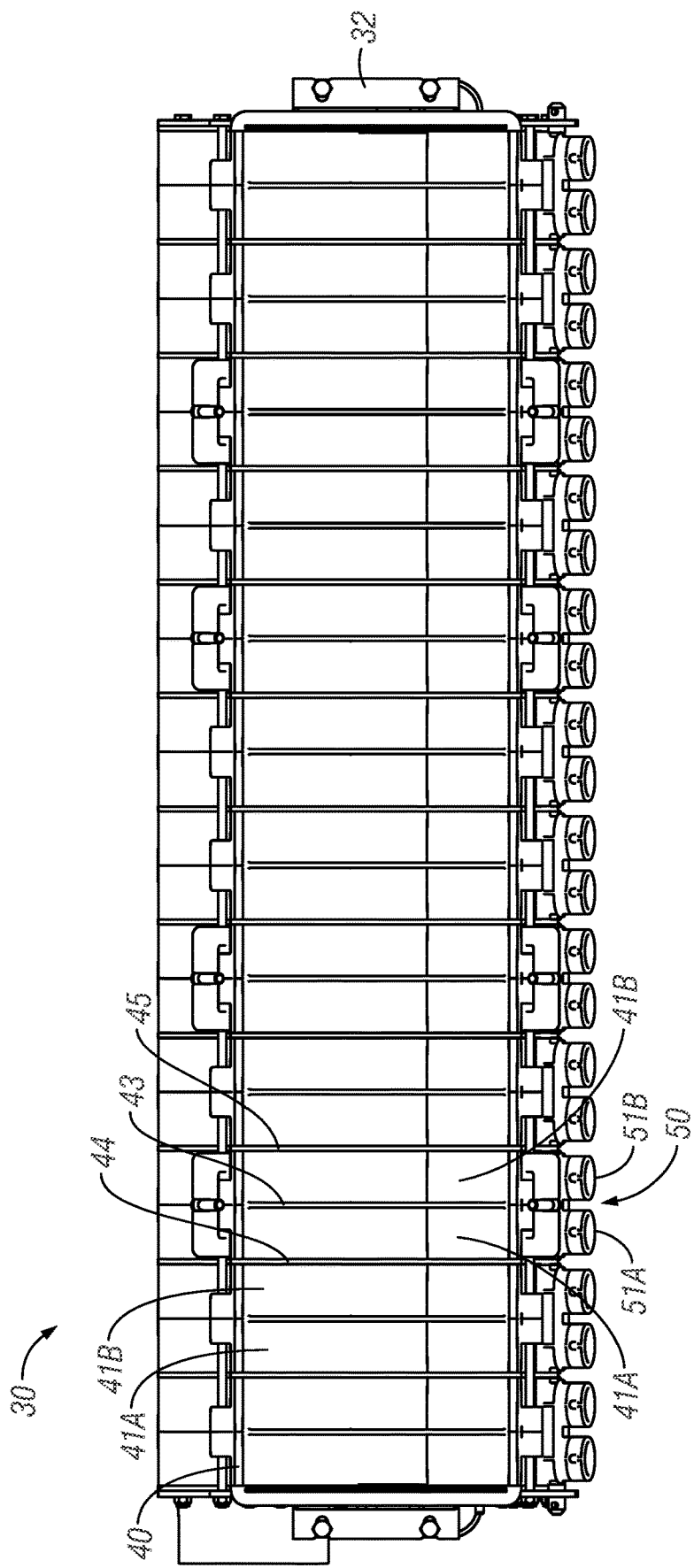
FIG. 8 is a top elevation view of an air entrainment assembly.

FIG. 8 is a top view of an air entrainment or seed delivery assembly 30, according to at least some embodiments of the invention. As noted, the assembly 30 will include an inlet 32 for passing air into the assembly 30, wherein the inlet 32 is connect to a fluid source. The assembly 30 is comprised of a plurality of entrainers 40, which may also be referred to as entrainment members, segments, or the like. The plurality of entrainment segments 40 are connected to one another to allow the fluid from the inlet 32 to pass through each of the segments 40 to be utilized to move the particulate material delivered to each of the segments 40 from the segments and to the one or more row units of the planting implement. Each segment 40 includes an opening at the upper end comprising a seed entrance 41. Furthermore, each segment 40 is separated into first and second sides such that each segment 40 will have a first seed entrance 41a and a second seed entrance 41b, which is separated by an inner wall 43. Therefore, as will be understood, each segment 40 will be utilized to deliver a particulate material, e.g., seed, from the segment 42 one or multiple row units via each segment 40. This will be disclosed further and will be able to be understood herein. The seed passes into the portions the first and second sides of the segments 40 via the entrances 41a, 41b and is separated by the inner wall 43. Furthermore, each segment is defined by a first outer wall 44 and a second outer wall 45 to designate and define the boundaries of the segment 40. Each segment will also include one or two outlets 48 and can include an outlet insert 50 which includes seed exits 51a, and 51b, which corresponds to the first and second sides of each segment. However, as will be understood, additional outlets can be utilized to provide for the seed for other particulate material of each segment to be delivered to one or multiple row units.

Figure 9:
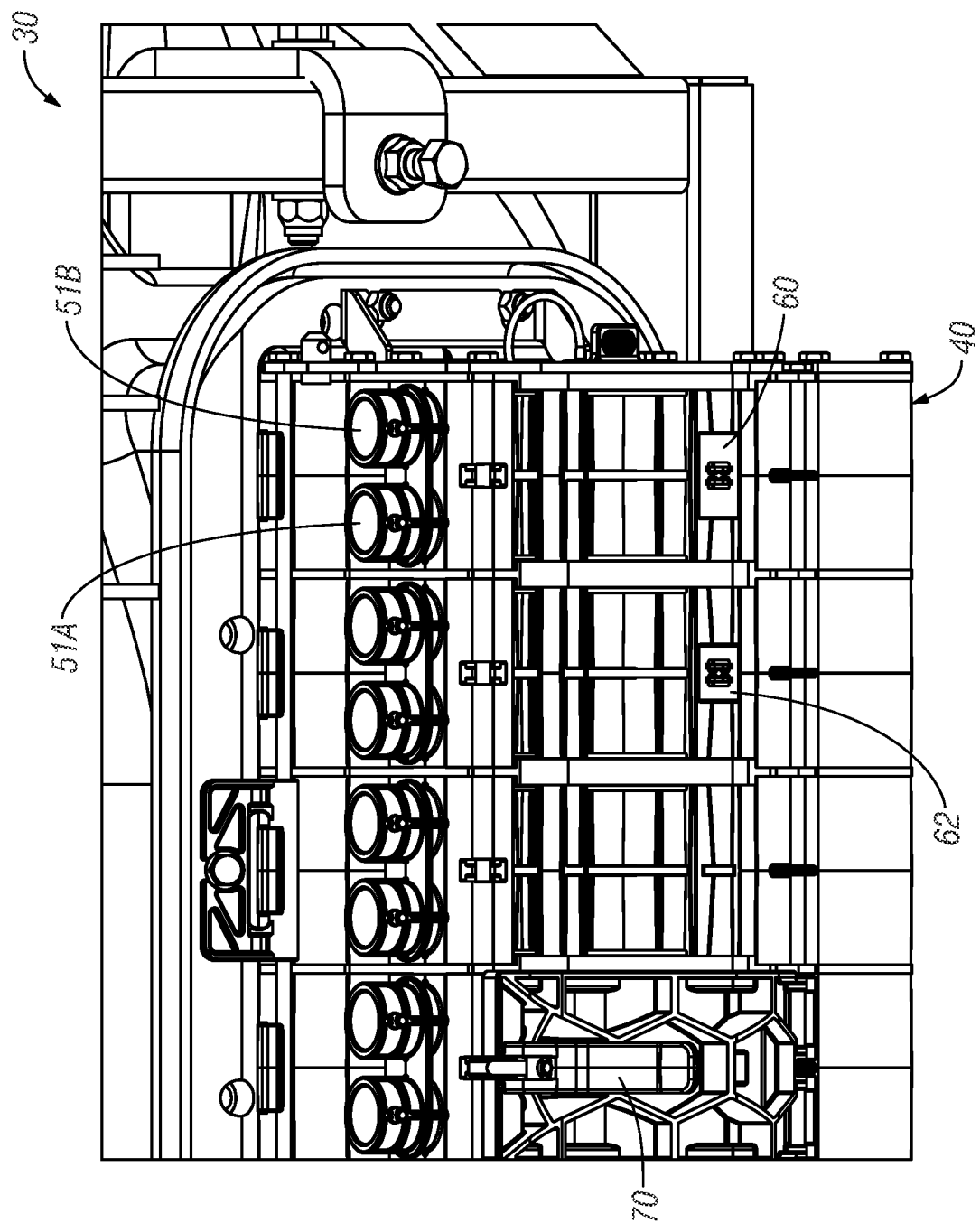
FIG. 9 is a view of an enlarged portion of the air entrainment assembly.

FIG. 9 is a view of an enlarged portion of the seed delivery system 30 according to some embodiments including aspects of the invention. As noted, the entrainer 40 can include an outlet insert 50 positioned generally at the outlets 48a, 48b, of the entrainer segment 40. As will be understood, the outlet insert 50 can vary and direct the seed or other particulate material from the entrainer segment 40 to one or more row units, such as via the outlet 50. For example, as is shown in FIG. 9, the outlet 50 includes first and second seed exits 51a, and 51b. The exits 51a and 51b can be individually connected to different meters and/or different row units such that the seed of the singular entrainer segment 40 can be divided and sent to different locations. However, as will be understood, the exit of the seed from an entrainer segment 40 can be combined and sent to a common location, for instance with a different outlet insert 80. Additional elements show in FIG. 9 include a clean outdoor 70, positioned generally on the underside of an entrainer segment 40. A cleanout door 70 can be rotatably or pivotally connected to the entrainer segment 40 such that it is selectively connected to selectively open and/or close the door 70. When opened, the entrainer segment 40 can be cleaned out, such as by gravity or other cleaning methods to remove the remainder of any particulate material from the interior of the entrainer segment 40. It is also included in FIG. 9 and shown by the removal of the cleanout doors 70 a bypass insert 60 and another bypass insert 62. As will be understood, each of the entrainer segments 40 include different passages, including, but not limited to, a main passage for fluid and particulate material, and a bypass channel for bypassing an amount of fluid in which the bypass fluid does not immediately interact with a particulate material and instead recombines with a combined amount of fluid and particulate material at or near the outlet 48 of the entrainer segment 40 in order to increase and/or aid in the movement of the particulate material from the entrainer segment 40 and towards the row unit and/or seed meter. The bypass inserts 60, 62 are shown to be of varying widths, and can be included in some embodiments to adjust an amount of airflow passing through a bypass channel. This easy inclusion of such an insert 60 or 62 can quickly and easily adjust an amount of airflow to account for varying lengths of conduits extending between a particular entrainer segment 40 and its end-use location, i.e., row unit and/or metering member. Therefore, the use of the inserts can be selective when it is determined that an amount of air flow to move the particulate material is needed to be increased and/or decreased, or otherwise regulated and provides over uses of sleeves in that they are easily included and removed on an as needed basis. For example, when the length of the hose is increased, such as when the number of row units and thus the width of a tool bar is increased, the insert can be included to reduce the bypass air and to increase the amount of air passing through the main passage and into combination with the particulate material. In some implements, the further rows can be approximately 90 feet from a particulate entrainment segment 40, and thus it may require higher amounts of air to be combined with a particulate material and used to deliver the particulate material towards the row units at the greater distance. However, when the conduits length is shortened, the inserts may not be required, and the bypass air can aid in passing and providing an on demand amount of seed or other particulate material to the row units and/or seed meters.

Figure 10:
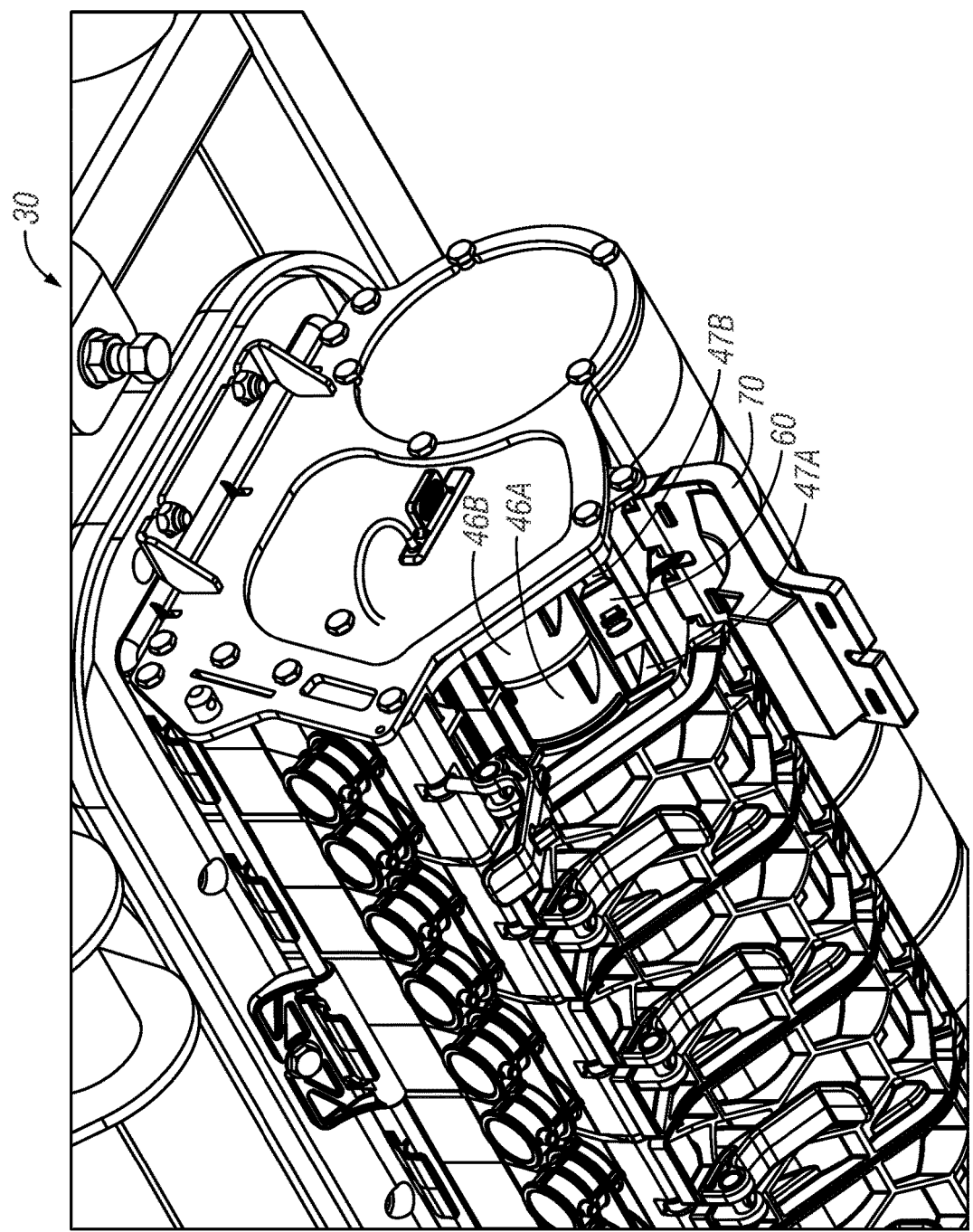
FIG. 10 is a perspective view of FIG. 9.

FIG. 10 is another perspective view of FIG. 9 showing additional aspects of the assembly 30. As disclosed, the entrainer segments 40 will include primary fluid paths 46a and 46b as well as bypass paths or channels 47a, 47b. These are positioned on opposite sides of the inner wall 43 of the entrainer segment. The insert 60 can be positioned generally on the inner wall 43 and can extend into both bypass channels 47*a*, 47*b* to adjust the amount of airflow passing therethrough. This can also aid in increasing the air flow by reducing the cross-sectional area of the bypass channels 47*a*, 47*b*, which work as a sort of nozzle to increase or decrease the airflow passing before the bypass air recombines with the air that is passed in the primary fluid channel 46 and has combined with an amount of particulate material. Therefore, the width of the insert 60, 62 can thus vary the amount of air passing through the bypass channel 47 to increase or possible even block the air from moving through the bypass channel. However, the width can be changed as needed to create the nozzle effect as well.

FIG. 10 also shows the cleanout door 70 connected to an entrainer segment 40 via a pivot portion 71 in which the door is able to pivot to open and close access to an underside of the entrainer segment 40. The door can be selectively closed or opened via a latch or other mechanical means to close and at least partially seal the underside of the entrainer segment 40.

Figure 11:
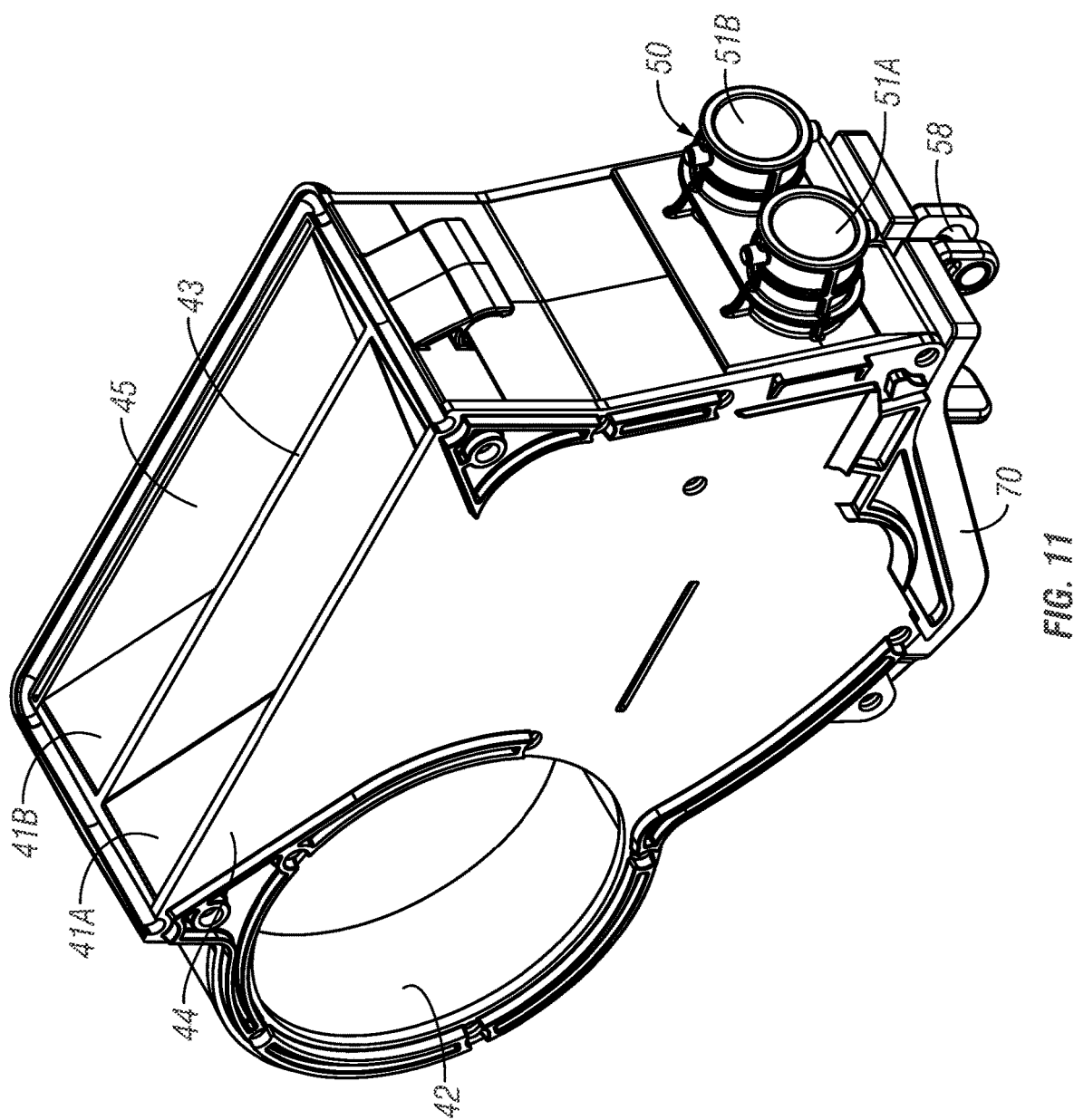
FIG. 11 is a perspective view of an entrainment device of the assembly as shown in FIG. 8.

FIG. 11 is a perspective view of an entrainment device or segment 40 according to aspects of the invention. As noted, each entrainer segment 40 is generally a first outer wall 44 and a second outer wall 45, and the interior sections being split with an inner wall 43. The position of the inner wall 43 is generally equal distance between the first and second walls 44, 45, but this is not necessary, and the first and second sides of the entrainer device can vary such that the inner wall 43 is off set to provide one side being larger than the other. The entrainer segment 40 includes a first seed entrance 41*a* and second seed entrance 41*b* on opposite sides of the inner wall 43. As noted, seed can be feed to the entrainment 40, such as via gravity from the hopper 22 and into the entrances 41*a*, 41*b*. Air other fluids can enter the entrainment segment 40 via the entrance 42, which is generally transvers to the seed entrances 41. As noted, the segments 40 are connected to have generally common or aligned fluid inlets 42, and as will be understood, the fluid can be dispersed into the individual entrainment segments 40, such as moving in a perpendicular or otherwise transvers direction into the interior of the segment 40, as will be understood. A door 70 is positioned at an underside of the entrainer segment 40 to provide closer thereat. Furthermore, the entrainment segment 40 as shown in FIG. 11 includes an outlet insert 50 positioned generally at the outlets 48 of the entrainer segment 40. The outlet insert can be positioned at the outlet to provide connection to one or more row units and/or metering units to provide an amount of on demand particulate material from the entrainment segment 40. For example, in the embodiment shown in FIG. 11, the outlet insert 50 includes to exits 51*a* and 51*b*. Each of the exits 51*a* and 51*b* can be connected to different or common metering members and/or elements of row units of an implement 10. Therefore, the use of multiple exits 51*a* and 51*b* provide for flexibility to have one entrainer segment 40 be used to feed or otherwise provide an on demand amount of particulate material to multiple and uses. The insert 50 can be connected to the entrainer segment, which will be understood, at a pivot connection 58 at a lower end, wherein the insert 50 can be pivoted to selectively be connected to the particular entrainer segment 40.

Figure 12:
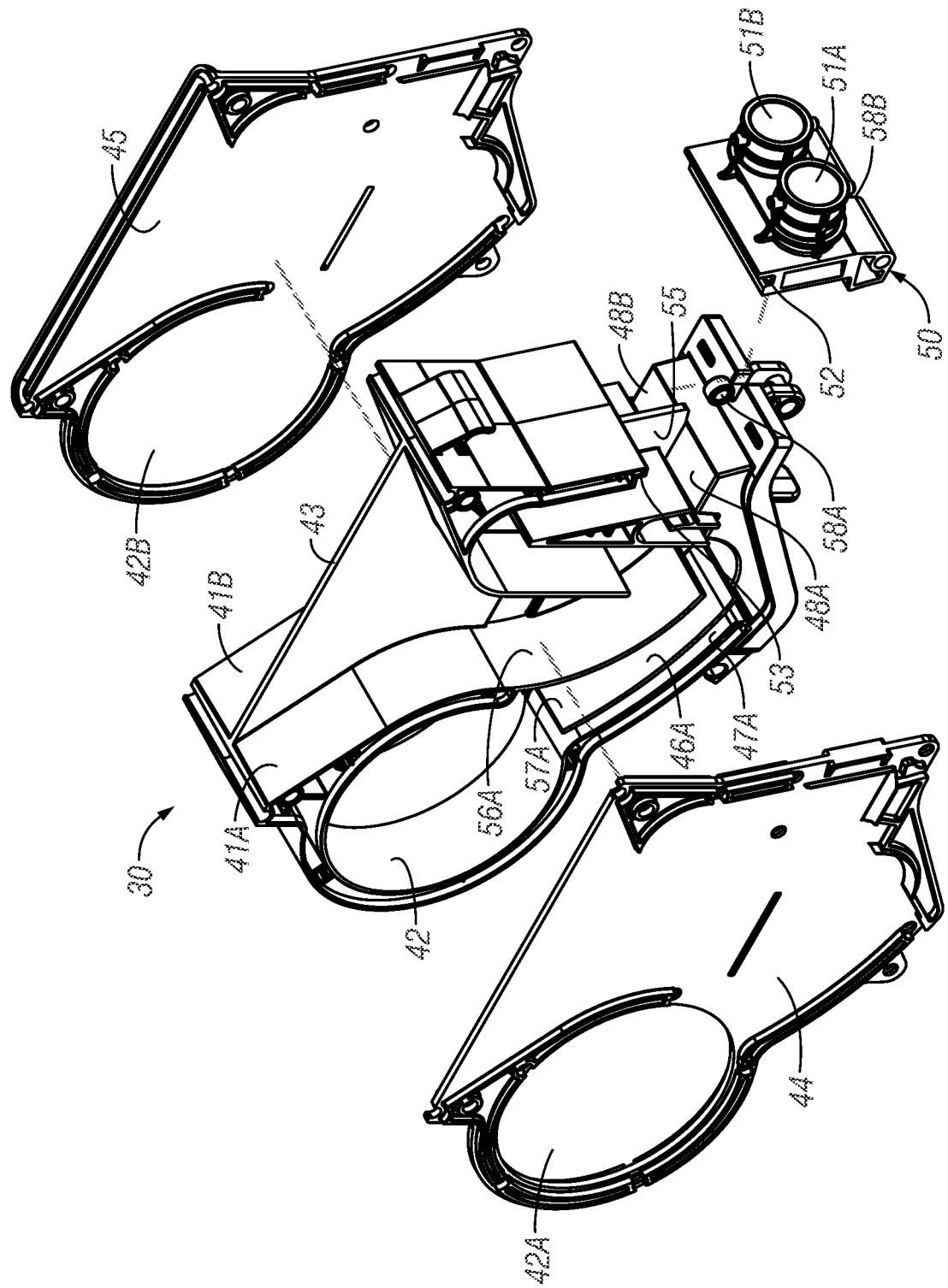
FIG. 12 is an exploded view of an entrainment device according to aspects of the present disclosure.
Figure 13:
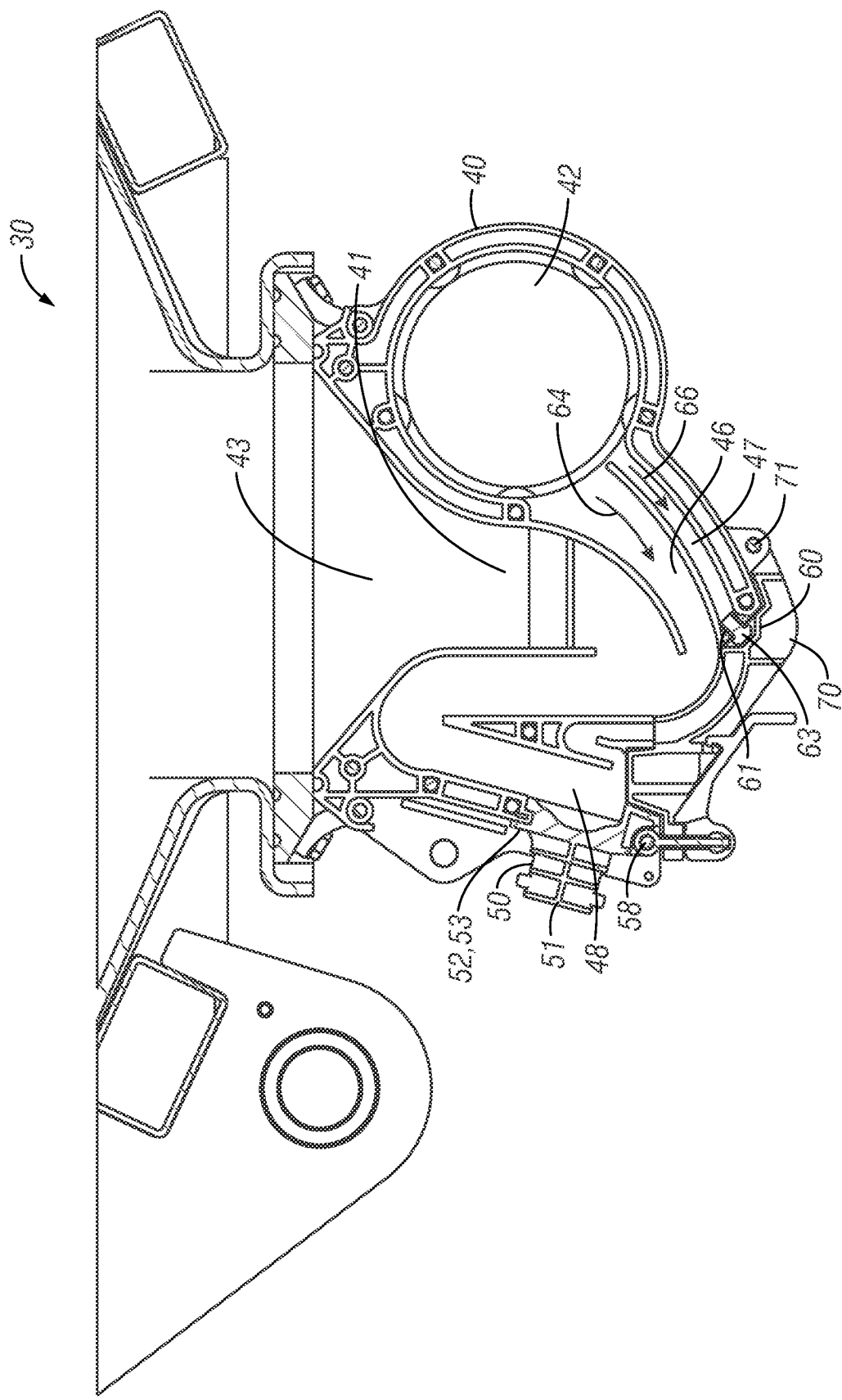
FIG. 13 is a side sectional view of an entrainment device connected to the air entrainment assembly.

FIG. 12 is an exploded view of the entrainer segment 40. As noted, the entrainer segment includes outer walls 44 and 45. Each of the walls includes apertures for the fluid or air inlet 42. An inner wall 43 bisects the interior between the walls 44, 45 to provide first and second cavities for seed entrances 41*a*, 41*b*. The seed can therefore be dispensed into the entrances 41*a* and 41*b* onto a seed inlet wall 56*a* and 56*b*. The wall 56*a* and 56*b* separates the seed from a primary fluid path 46*a* and 46*b*. The primary fluid path 46, as will be understood, receives air from the air inlet 42 and directs the air via a primary path wall 57*a*, 57*b* to interact with an amount of particulate material and to combine the fluid and the material to direct the combined fluid and material towards one or more outlets 48*a*, 48*b*. A second fluid path, which may be referred to as a bypass path 47a, 47b are positioned generally and at least partially below the primary path walls 57a and 57b. The bypass path and channel allow for a separated amount of air or other fluid to be directed in a path that does not directly combine with the particulate material in the entrance 41 of the entrainer segment 40. The air or other fluid in the bypass 47a, 47b will be directed around the primary path and will be recombined with the combination of the primary fluid and a particulate material at or near the outlets 48a and 48b of the entrainer segments 40. The primary and bypass airs and the material combination will then be directed via the outlets 48a, 48b into the outlet inserts 50. The exits 51a and 51b of the insert 50 will direct the combined fluid and the particulate material combination towards the end uses, which may be row units, metering members, or the like, on and on demand and needed basis. As shown in FIG. 12, the insert 50 includes two exits 51a and 51b such that the singular entrainer segment 40 can be utilized to direct the particulate material to two different end uses via the conduits connected to the exits 51a and 51b. Additional elements shown in FIG. 12 include an outlet partition 55, which separates the outlet 48a, 48b of the entrainer segment 40. The partition 55 aids with the dual exits 51a and 51b of the insert 50 to direct the combined seed and air towards different end uses. Furthermore, the outlet insert 50 can be connected to the entrainment segment 40 via a pivot connection 58 which includes portions 58a and 58b, and a connector lip 52 on the inserts and an edge 53 of the segment. However, it should be appreciated that the insert 50 can be attached in other manners as well.

FIG. 13 is a side section view of an entrainment device 40 connected to the assembly 30 and hopper 22 thereof. The Figure shows one side of an entrainer segment 40 such that the figure shows the inner wall 43 at the seed entrance or particulate matter entrance 41. As noted, the particulate matter will enter the entrainer segment 40 via gravity at or near the entrance 41 and can rest or pool temporarily at the wall 56. Air or other fluid enters the entrainment segment 40 via the air inlet 42, where it will be separated into the primary fluid path 46 and the bypass path 47. As shown in FIG. 13, the air moves in the direction of the arrow 64 into the primary fluid path 46 and in the direction of the arrow 66 into the bypass path 47. The arrow or the fluid of the primary fluid 46 will combine with the particulate material that has pooled in the seed entrance 41 and will continue in the direction of the arrow 67 towards the outlet 48. The arrow 67 will include a combination of the particulate material and the air of the primary path. The air in the bypass path 66 will continue as well towards the outlet 48 and can interact the insert 60 which may be positioned at least partially in the bypass path 47. As noted, the insert 60 can be included to adjust the amount of airflow passing therethrough and can increase and/or decrease the air flow passing through the bypass path before it combines with the combination of the primary air and the particulate material. The bypass air will then continue towards the outlet 48 where it will be combined with the combination of the primary air and the particulate material and will be directed in the direction of the arrow 69 out the outlet 48 and into the outlet insert 50.

The seed will then be delivered via the insert 50 and via the exit 51 of the insert 50 and towards the end use, such as via a conduit towards the row unit and/or metering member thereof. As noted, the outlet insert 50 can be connected to the entrainment device 40 via a pivot point 58 and a lift and channel connection 52, 53.

Furthermore, the insert 60 or insert 62 can be positioned generally at the inner wall 53 and extending into the bypass path 47. Exemplary embodiments of different sizes of inserts are shown in FIGS. 14a and 14b. FIG. 14a is generally narrower or less wide insert, and 60 is the wider insert. Each of the inserts 60, 62 include tab 63 which can attach and temporarily adhere or otherwise be connected to the inner wall 53 within the bypass path 47. The insert is shaped to fit within the bypass path and includes a beveled portion 61 which utilizes the force of the fluid itself to aid and preventing or otherwise mitigating movement of the insert 60, 62 while in the bypass fluid path.

Figure 15:
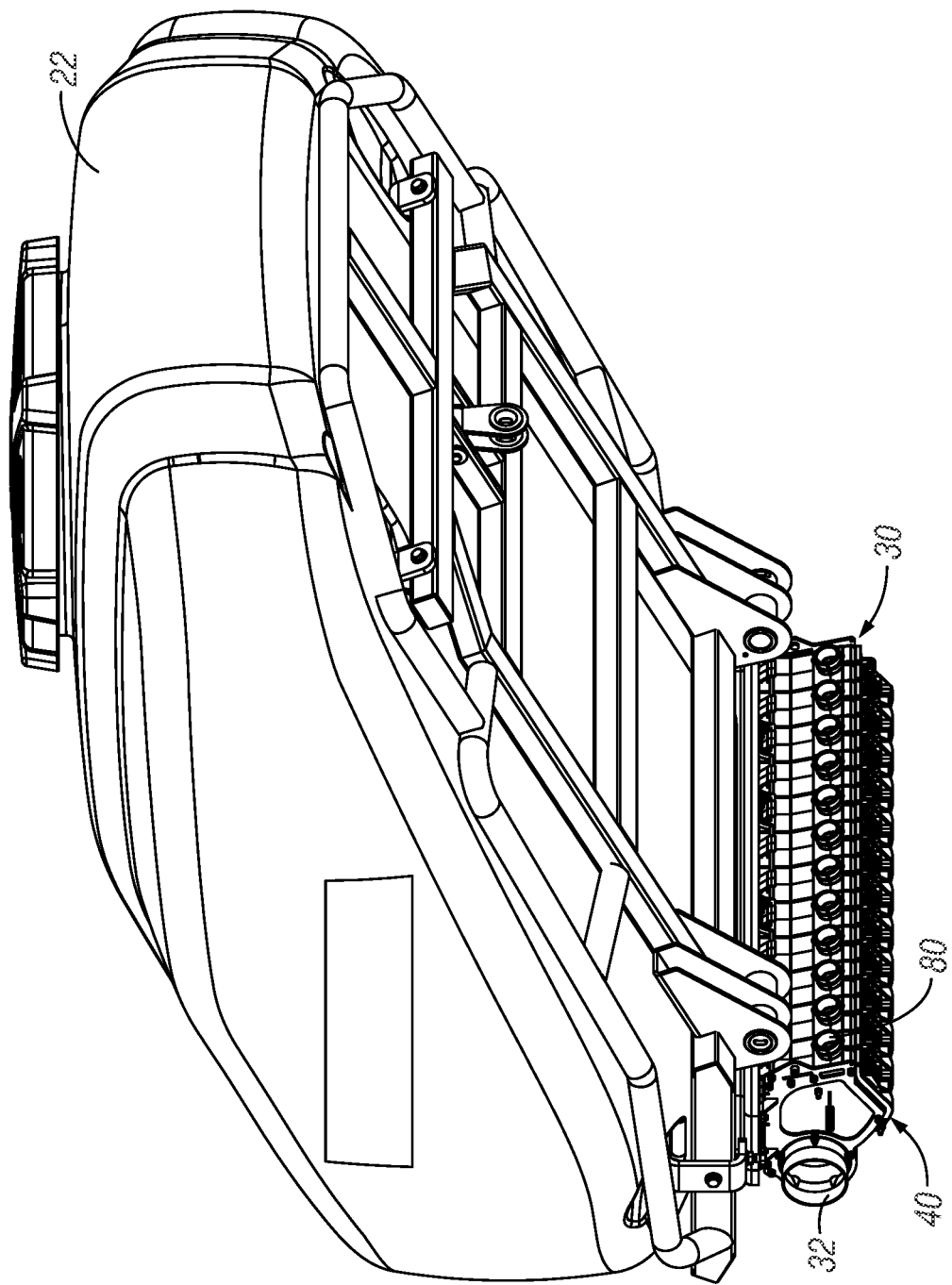
FIG. 15 is a perspective view of another air seed delivery system including an exemplary hopper and an air entrainment assembly.
Figure 16:
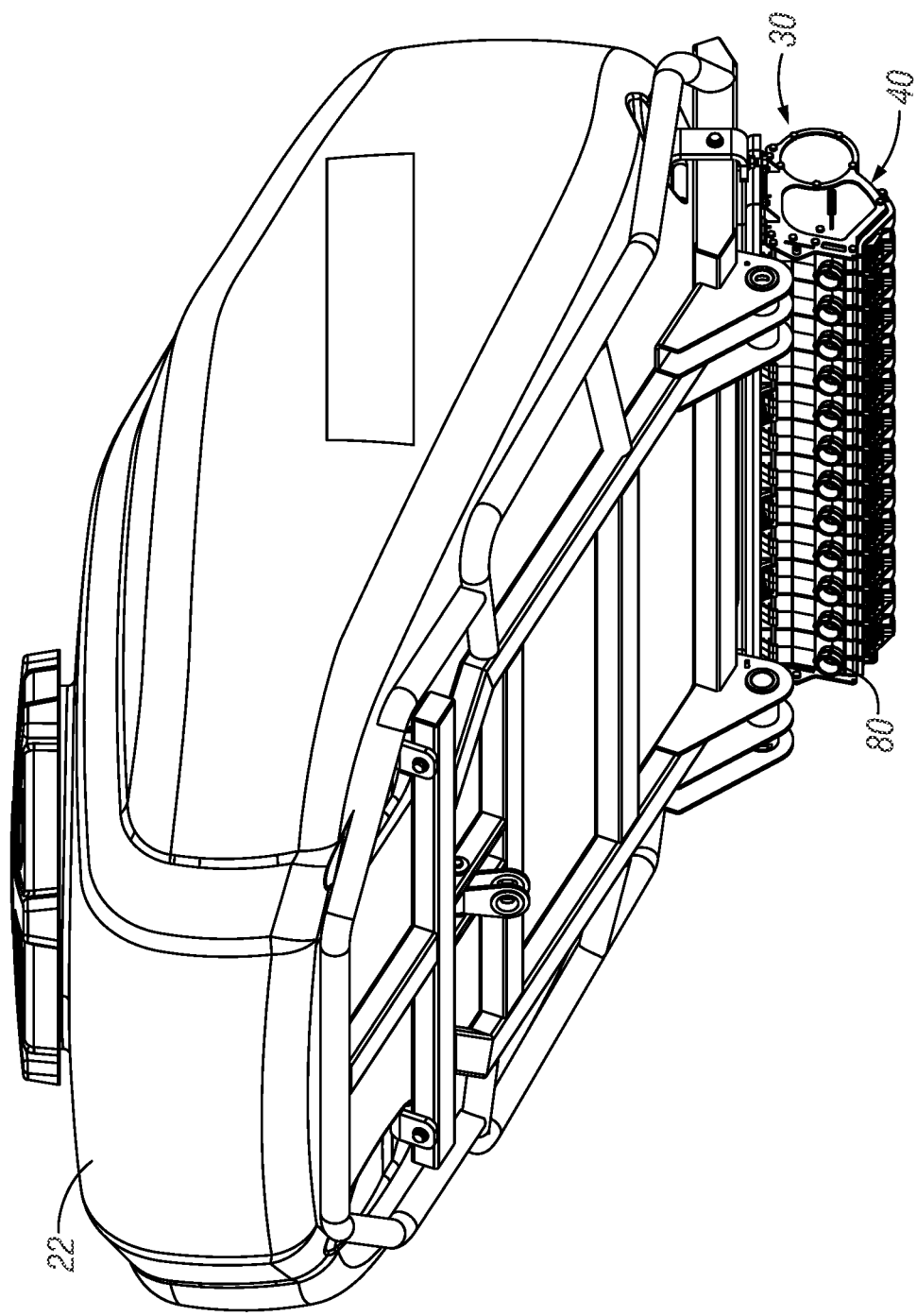
FIG. 16 is another perspective view of the system of FIG. 15.

FIGS. 15 and 16 are additional embodiments of a seed delivery assembly 30 including a plurality of entrainer segments 40 for use with one or more hoppers 22. The entrainers 40 are generally similar to or the same as those previously disclosed and described, with the exception of a different outlet insert 80. As will be understood, the outlet insert 80 shown in the figures will combine both sides of an entrainer segment 42 increase the amount combine both sides of the entrainer segment 40 to direct the particulate material to both sides to a common end use such as a row unit, metering member or otherwise ground engaging element. This will generally increase the amount of material to meet volume requirements, such as when planting at higher speeds (e.g. speeds higher than 8 mph). This can also increase the population planting by delivering more material to row units or other end use locations, such as providing above 100 seeds per second and up to and increasing over 200 seeds per second. The larger nozzle size of the exits 81 of the insert 80 allows for more than double the capacity of seed to be delivered with comparison to the individual exits 51a, 51b of the insert 50.

Figure 17:
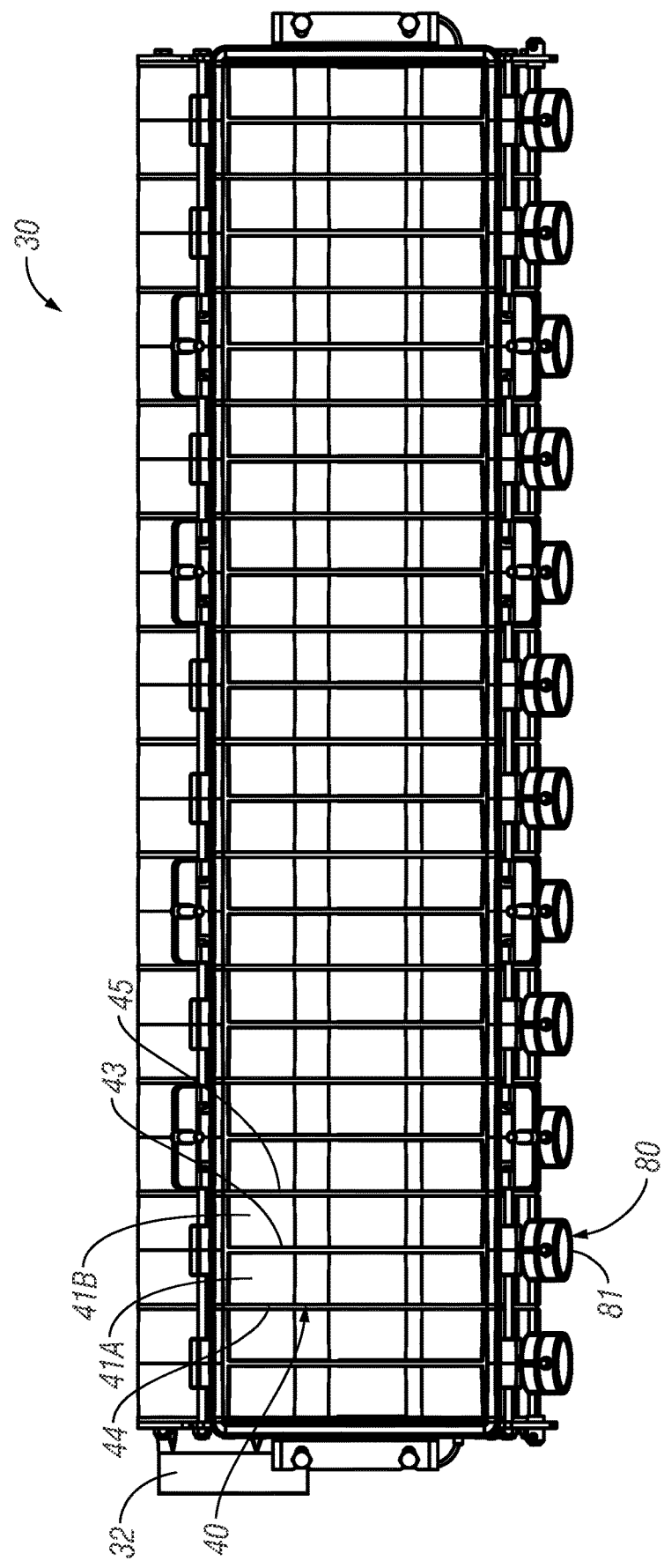
FIG. 17 is a front elevation view of an air entrainment assembly for use with the system of FIG. 15.

Therefore, FIG. 17 is a top view of an assembly 30 including a plurality of an entrainer segments 40 connected to one another. As noted, the segments are similar in which they have shared air inlets to receive air from the inlet 32. The segments 40 are divided into two sections still and included inner wall 43 bisecting outer walls 44 and 45. Furthermore the segments 40 include entrances 41a and 41b to receive seed or other particulate material from the hopper 22. However, as is shown in FIG. 17, the outlet insert 80 includes a single exit 81 for use with both sides 41a and 41b of the segment 40 to direct the particulate material to a common end use.

Figure 18:
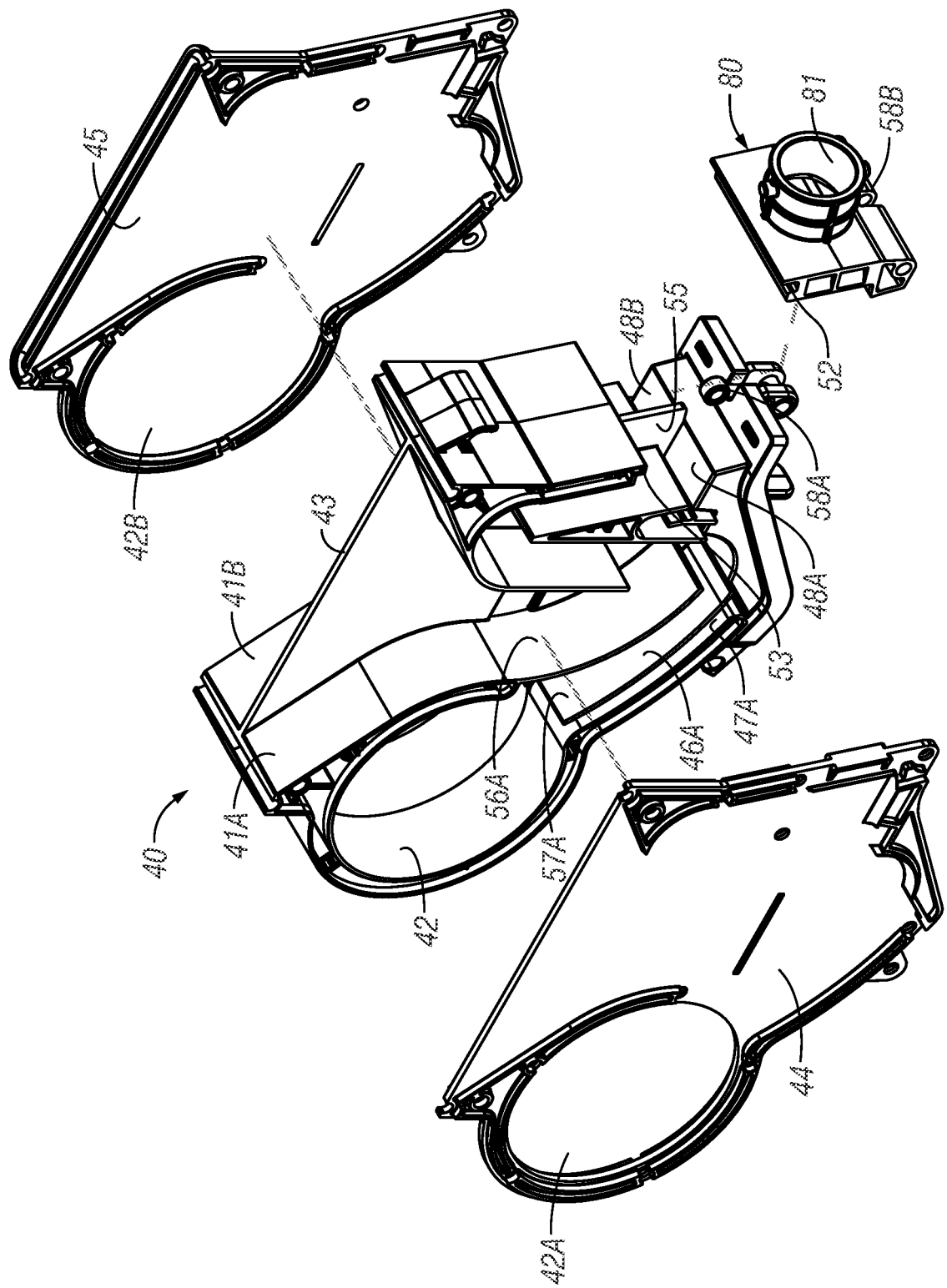
FIG. 18 is an exploded view of an entrainment device according to aspects of the present disclosure.

FIG. 18 is an exploded view of an entrainment segment 40 according to aspects of the invention. Again, the makeup of the entrainer segment 40 is similar to that previously disclosed and will not be redisclosed herein. The segment has been disclosed with respect to FIG. 12, and therefore the components would be similar to or the same as that previously disclosed. However, it is noted that the insert 80 interacting with the outlets 48a and 48b is different than the outlet insert 50. As noted, the outlet insert 80 includes a single seed exit 81. This will allow the connection via the exit 81 to a conduit or other device to deliver seed to a singular end use location such as a row unit or metering member. The seed of each side of the entrainer 40 is combined generally at or near the outlets 48a and 48b to be directed via the singular exit 81. In some instances, the partition 55 can be bored out or otherwise physically removed to provide for a common outlet 48 to receive the particulate material and fluid from each side of the entrainer segment 40. According to other embodiments, the partition 55 is a modular piece, which can be selectively removed when selecting between a single exit, such as shown in FIG. 18 and a dual or multi exit, such as shown in FIG. 12. In either case, the entrainer segment 40 will operate generally the same to receive seed on either sides of the wall 43, and to have the primary and bypass paths wherein the primary fluid path interacts with a pool or particulate material at or near the entrance 41 wherein the combination of the primary fluid and the particulate material is recombined with the bypass fluid at or near the outlet 48 before being directed via the exit 81 and insert 80.

Figure 19:
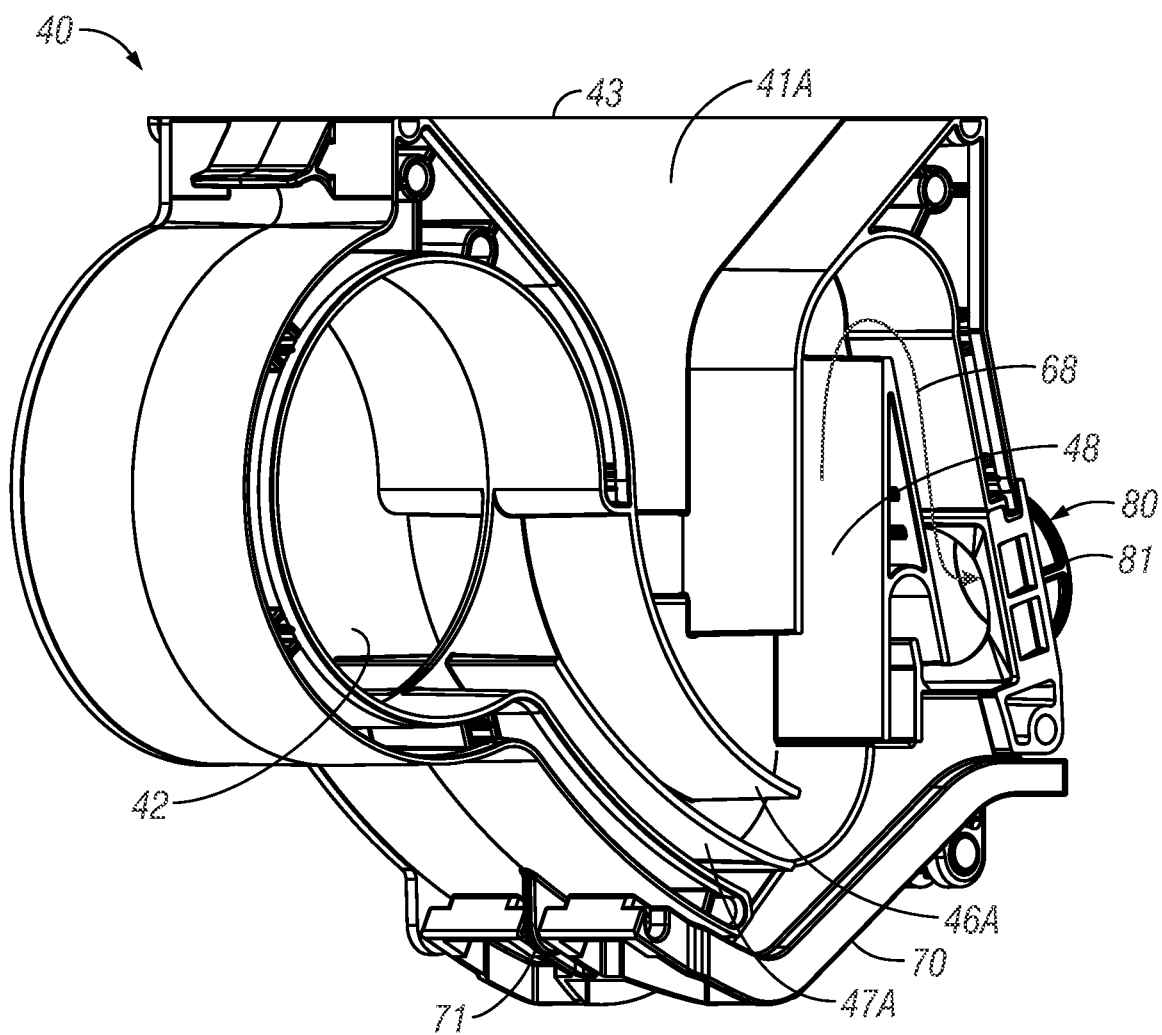
FIG. 19 is a perspective view of the entrainment device of FIG. 18.

FIG. 19 is a perspective view of the entrainment device 40 of FIG. 18 and shows the fluid paths thereof. As noted, the arrow 68 provides the direction of the combined air and seed of the entrainment device 40 wherein the combination is recombined at or near the outlet 48 before being directed out the exit 81 of the insert 80.

Figure 20:
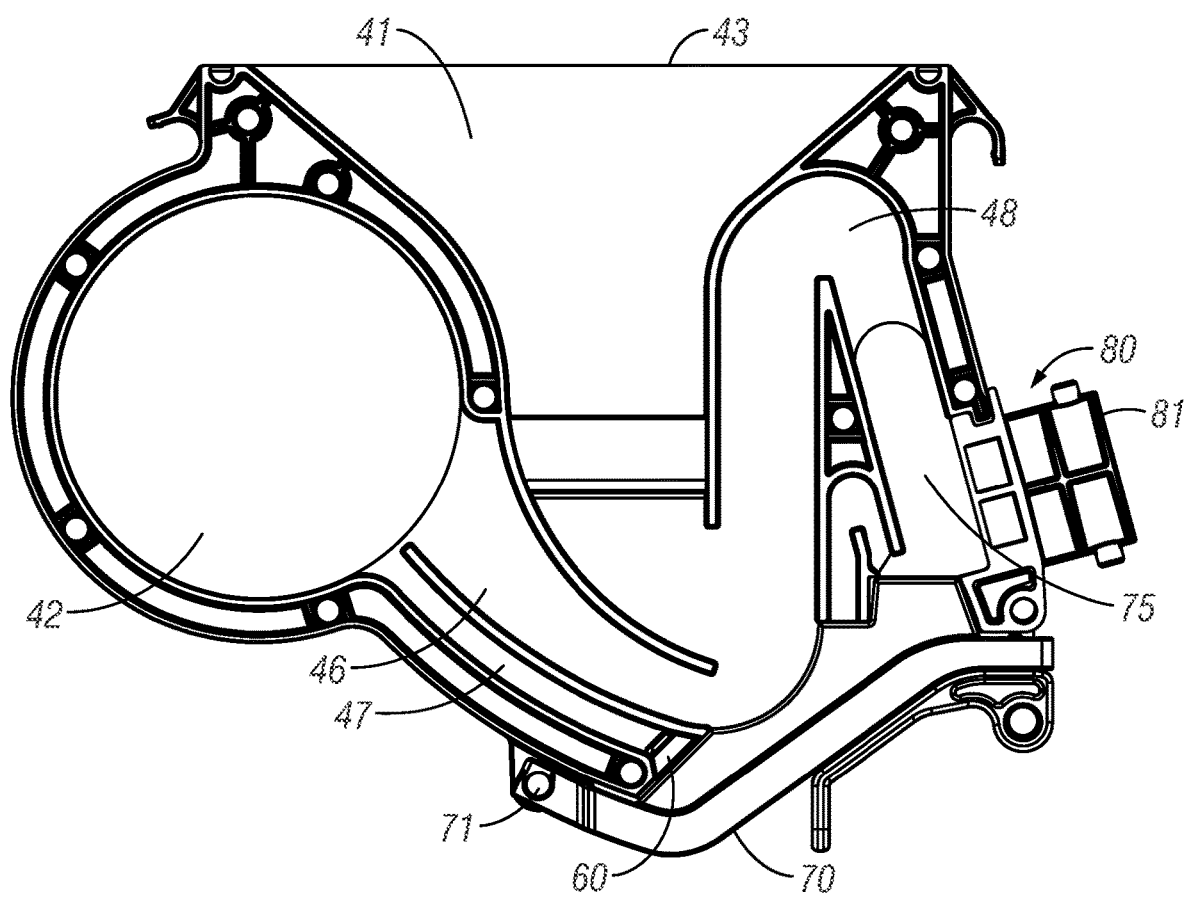
FIG. 20 is a side sectional view of FIG. 19.

FIG. 20 is a side section view of FIG. 19 wherein the partition 55 at the outlet 48 has been removed to combine the outlets 48a and 48b to a singular outlet before entering the outlet insert 80. In this manner, the entrainer segment 40 will operate in generally the same manner to separate the air from the insert 42 into primary and bypass channels and the primary air will combine with the seed pooled at the entrance 41 and the combined air and primary fluid will recombine with the bypass fluid near the outlet 48. However, in the embodiment shown in FIG. 20, the outlet 48 is not segmented via a partition, and is generally a common area from both sides of the entrainer segment 40 to be combined before exiting at the inert 80 via the seed exit 81. However, the entrainer segment 40 can still include either of the inserts 60 or 62, or does not require an insert, depending on the amount of air flow desired to aid in moving the particulate material to the in use location.

Figure 21A:
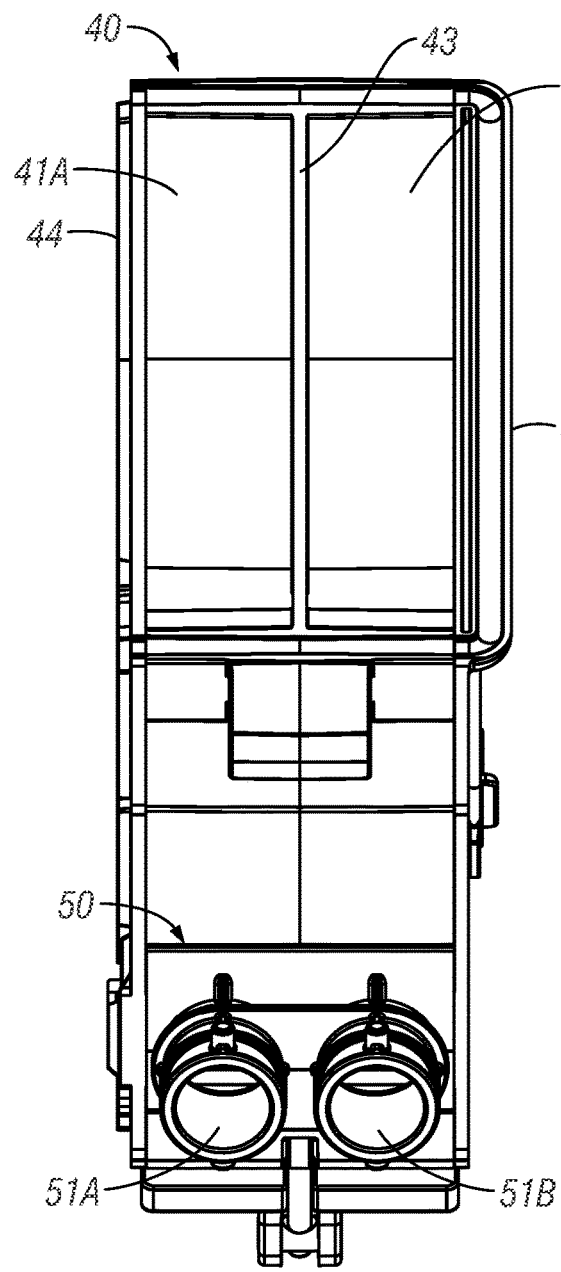
FIGS. 21A and 21B are illustrative views of entrainment devices according to aspects of the invention.
Figure 21B:
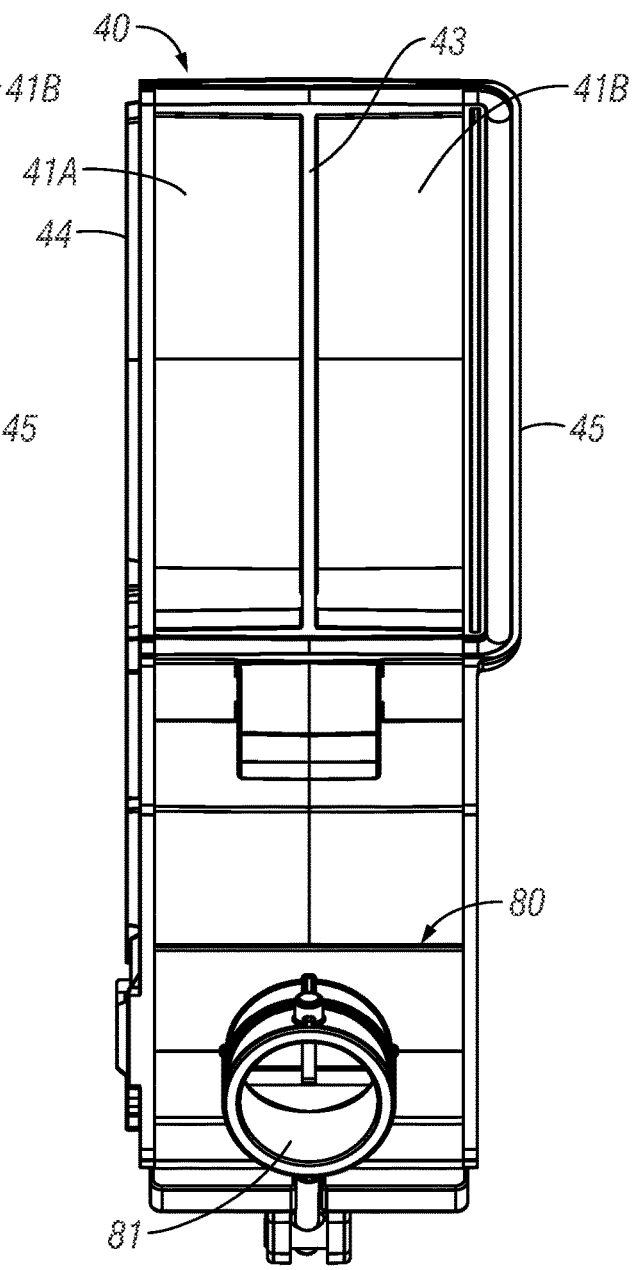

FIGS. 21a and 21b are illustrative use of entrainment devices 40 according to aspects. As shown in FIG. 21a, the insert 50 includes dual exits 51a and 51b. The embodiments shown in FIG. 21b includes the insert 80 with a singular exit 81. As noted, the remainder of the entrainer segment 40 will generally be the same, with the difference being in FIG. 21b, the outlet 48 will be adjusted such that there will be no or a reduced partition 55 separating the outlets on the other side of the segment 40 such that the seed from both sides are combined before exiting via the exit 81. In FIG. 21a, the partition 55 will remain such that seed from each side is exited via the exits 51a and 51b.

Figure 23:
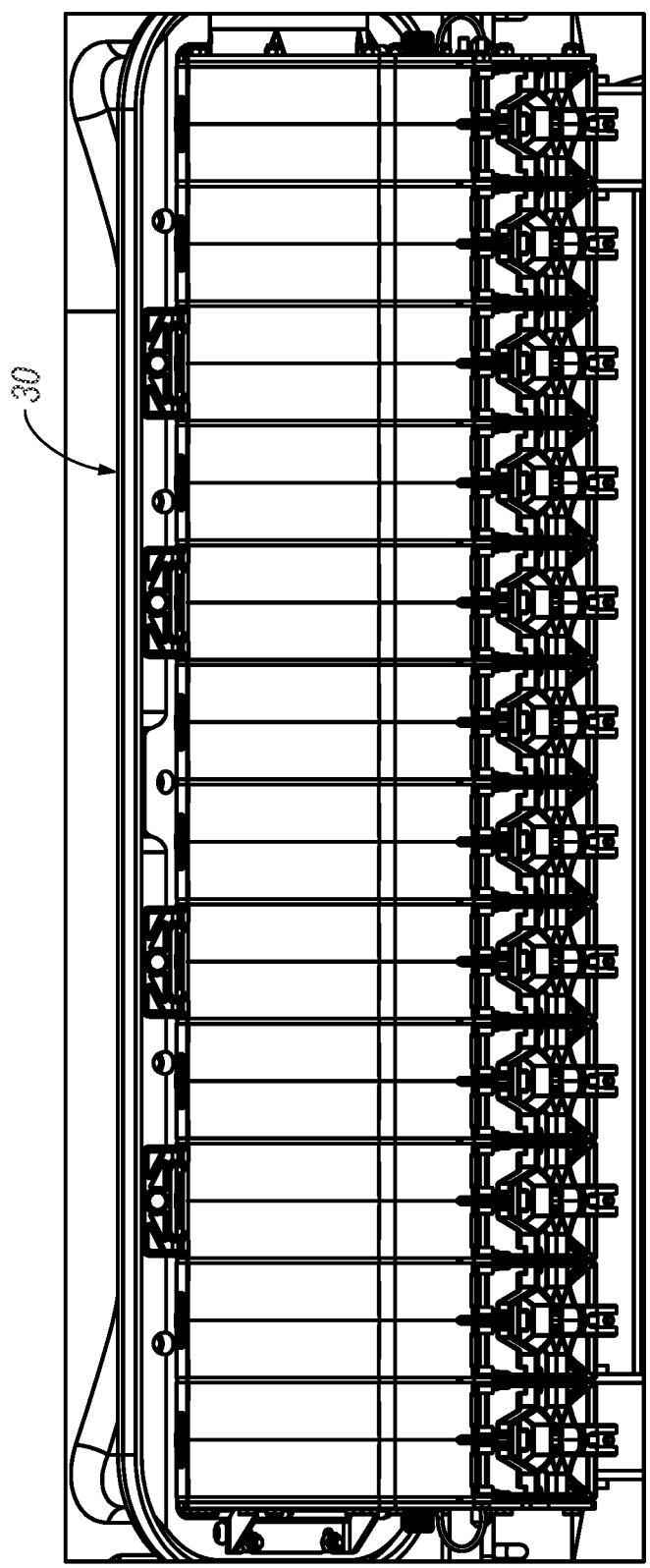
FIG. 23 is a front view of FIG. 22.
Figure 24:
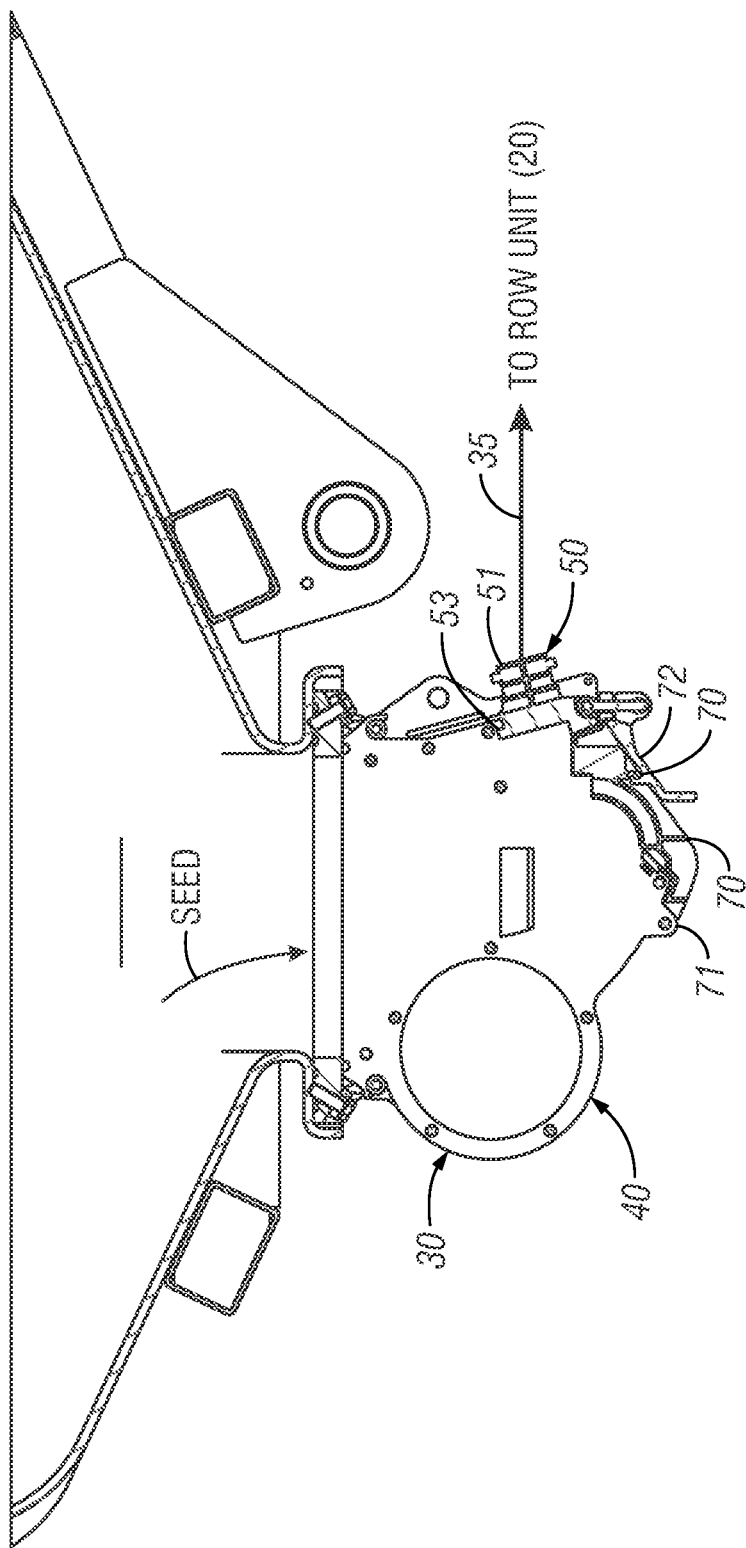
FIG. 24 is a side elevation view of FIG. 22.

FIG. 22 is a rear view of an entrainment system 30 and includes the insert 50 with the dual exits 51a and 51b. As understood, the exits 51a are towards the rear of the assembly 30 to be delivered to and use locations, which may include row units, metering members, ground engaging elements, or some combination thereof. FIG. 23 is another illustrative view of the bottom side of an assembly 30. FIG. 24 is a side elevation view of FIG. 22 showing an end of the assembly 30. The end of the assembly 30 is not the fluid entrance side, as there is no entrance shown into the plurality of segments 40. As noted, the seed will pass into the segments and the air will direct and combine with the seed to direct the combined air and seed out the segments and via the insert 50 by way of the exit 51 towards a row unit 20 or other end use application, such as via a conduit 35.

Figure 25:
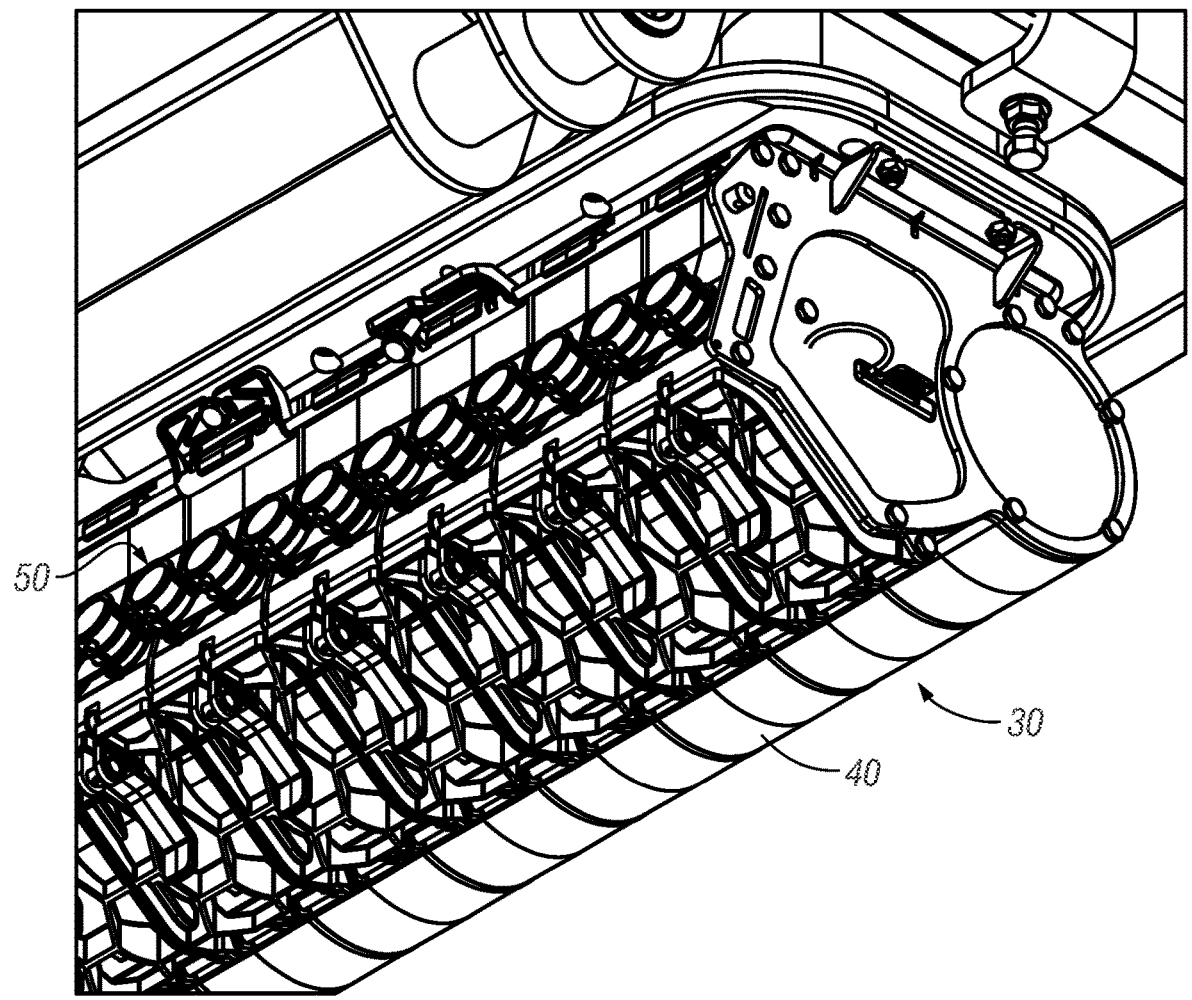
FIG. 25 is an enlarged view of a portion of the system of FIG. 22.

Finally, FIG. 25 is another exemplary embodiment of the assembly 30 showing the plurality of segments with the insert 50 attached thereto.

Additional advantages of the systems, methods, and/or apparatus shown and described herein should be apparent to those skilled in the art. For example, according to some exemplary embodiments, the entrainment system could be operated in different manners. Consider a 12-row planter, but an entrainment system having 24 entrainer units bundled together. Some embodiments may consider the configuration shown in FIG. 18, where there is a single output/outlet, and with or without the wall/partition 55. Other embodiments may consider the embodiment of FIG. 12, and only using one of the sides of the entrainer. However, additional aspects and/or embodiments may include the configuration shown in FIG. 12, but with the partition 55 removed. This would open up both sides of the entrainer to receive seed and to be distributed. One of the outlets would be capped, as there are fewer connections to row units than entrainer units. However, removing the partition 55 would allow for cleanout of both the entrainers, as well as the hoppers feeding the entrainers. The seed from either entrainer section (e.g., 41A or 41B) could be directed to the sole outlet and communicated to the corresponding row unit, which would ensure that all of the seed from both sides of the wall 43 in the entrainer 40 is cleaned out. It would also allow all of the seed from the hoppers to be added to the entrainers, which cleans out both the hoppers and the entrainers. Thus, any of the configurations are considered to be part of the invention.

Therefore, in seed delivery assembly has been shown and described which includes variations to account for flexibility for an on demand of particulate material from one or more bulk hoppers to one or more end use locations, such as row units, metering members, or other ground engaging elements. The flexibility of the seed delivery assembly 30 shown and described provides numerous advantages. For example, the flexibility of using a singular entrainer 40 to provide the on demand material for one or two row units allows for flexibility of the planter in different settings and to provide a more modular type delivery system. For example, the use of multiple exits at the singular entrainer allows for a planter with more end uses to be utilized with the delivery system. However, when increased amounts of material is to be required, the assembly is not needed to be swapped out, and instead, the insert can be adjusted to provide for varying amounts of material to be delivered via the entrainer segments 40 to the end-use locations. Therefore, the units could be the sides of the entrainer segments 40 could be used together to meet volume requirements, such as for high speed planting or for planting higher populations of seed or certain seed types. The combined sides of the segments can more than double the amount of material that can be provided to meet such higher volume requirements such that the bigger diameter exit allows for more than double the capacity than the two smaller segments combined together. Furthermore, the use of one or more inserts in the bypass channels in the entrainer segments allows for an adjustable amount of airflow to be provided to account for differing lengths of hoses from generally centrally located air seed delivery system to the row units positioned along the toolbar of the implement. The varying width of the inserts in the bypass channels will allow for adjustable amount of airflow (i.e., adjusts bypass airflow ratio) accounting for the movement of the particulate material to the row units spaced generally along and away from the centrally located seed delivery system.

Thus, a seed delivery system has been shown and described. It is to be appreciated that varying aspects of the invention are to be considered part of the invention. In addition, it should be appreciated that individual components of the figures shown and described herein can be combined with other figures in such way that may not be explicitly shown in the figures to provide for additional aspects and/or embodiments of the seed delivery system and/or components thereof. Such changes will be obvious to those in the art and are to be considered to be part of the present disclosure.

The invention claimed is:

1. A method for delivering seed from one or more hoppers to a row unit of a planter including a plurality of row units, the method comprising:
   delivering seed from the one or more hoppers to a seed entrainer;
   introducing airflow to the seed entrainer such that a first air stream of the airflow is combined with seed, and a second air stream bypasses the seed; and
   recombining the first and second air streams of the airflow and seed at or near an outlet;
   wherein the outlet comprises:
      a first configuration comprising first and second outlets and wherein each of the first and second outlets are in fluid communication with separate row units of a planter, and
      a second configuration wherein the outlet comprises a single outlet in fluid communication with a row unit of a planter.

2. The method of claim 1, further comprising splitting the introduced airflow into a first and third air streams in the seed entrainer, wherein the first and third air streams combine with seed in different channels of the seed entrainer.

3. The method of claim 2, further comprising splitting the introduced airflow into a second and fourth air streams in the seed entrainer, wherein the second and fourth air streams bypasses seed in different channels of the air entrainer.

4. The method of claim 3, further comprising recombining the first and second air streams at a first exit of the seed entrainer, and the third and fourth air streams at a second exit of the seed entrainer.

5. The method of claim 4, wherein, in the first configuration of the outlet, the first and second exits are separated to deliver seed to different row units, and wherein, in the second configuration, the first and second exits are combined at the single outlet to deliver seed to a single row unit.

6. The method of claim 1, further comprising adjusting an amount of airflow of the second air stream prior to recombining with the first air stream.

7. The method of claim 6, wherein the step of adjusting the characteristic of the second air stream comprises inserting an insert into a path of the second air stream.

8. The method of claim 7, wherein the step of adjusting the characteristic of the second air stream comprises using an insert of varying width.

9. The method of claim 6, wherein the step of adjusting the characteristic of the second air stream comprises positioning an insert in a bypass channel of the seed entrainer.

10. A method for delivering seed from one or more hoppers to one or more row units of a planter including a plurality of row units, the method comprising:
    delivering seed from the one or more hoppers to a seed entrainer;
    introducing airflow to the seed entrainer such that a first air stream of the airflow is combined with seed in a primary air path, and a second air stream bypasses the seed via a bypass path;
    adjusting an amount of airflow of the second air stream in the bypass path; and recombining the first and second air streams of the airflow and seed at or near an outlet;

wherein the outlet comprises:

a first configuration comprising first and second outlets and wherein each of the first and second outlets are in fluid communication with separate row units of a planter, and a second configuration wherein the outlet comprises a single outlet in fluid communication with a row unit of a planter.

11. The method of claim 10, wherein the step of adjusting the characteristic of the second air stream comprises inserting an insert into the bypass path.

12. The method of claim 11, wherein the step of adjusting the characteristic of the second air stream comprises using an insert of varying width.

13. The method of claim 11, further comprising splitting the introduced airflow into a first and third air streams in the seed entrainer, wherein the first and third air streams combine with seed in first and third primary air paths of the seed entrainer.

14. The method of claim 13, further comprising splitting the introduced airflow into a second and fourth air streams in the seed entrainer, wherein the second and fourth air streams bypasses seed in second and fourth bypass paths of the air entrainer.

15. The method of claim 14, wherein the insert covers at least a portion of both of the second and fourth bypass paths.

16. A method for delivering seed from one or more hoppers to one or more row units of a planter including a plurality of row units, the method comprising:

delivering seed from the one or more hoppers to a seed entrainer;

introducing airflow to the seed entrainer such that a first air stream of the airflow is combined with seed in a primary air path, and a second air stream bypasses the seed via a bypass path;

adjusting an amount of airflow of the second air stream in the bypass path; and recombining the first and second air streams of the airflow and seed at or near an outlet.

17. The method of claim 16, wherein the step of adjusting the characteristic of the second air stream comprises inserting an insert into the bypass path.

18. The method of claim 17, wherein the step of adjusting the characteristic of the second air stream comprises using an insert of varying width.

* * * * *